US012062880B2

(12) United States Patent
Wason

(10) Patent No.: US 12,062,880 B2
(45) Date of Patent: Aug. 13, 2024

(54) PORTABLE IN-LINE DIELESS CRIMPING TOOL

(71) Applicant: Hubbell Incorporated, Shelton, CT (US)

(72) Inventor: Peter Matthew Wason, Derry, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/128,466

(22) Filed: Mar. 30, 2023

(65) Prior Publication Data

US 2023/0238760 A1 Jul. 27, 2023

Related U.S. Application Data

(63) Continuation of application No. 16/544,620, filed on Aug. 19, 2019, now Pat. No. 11,641,084.

(60) Provisional application No. 62/719,897, filed on Aug. 20, 2018.

(51) Int. Cl.
*B21D 37/10* (2006.01)
*H01R 43/042* (2006.01)
*H01R 43/058* (2006.01)

(52) U.S. Cl.
CPC ....... *H01R 43/058* (2013.01); *H01R 43/0427* (2013.01); *B21D 37/10* (2013.01); *H01R 43/0421* (2013.01)

(58) Field of Classification Search
CPC ...... B25B 27/10; B21D 37/04; B21D 5/0009; B21D 19/18; H01R 43/058
See application file for complete search history.

(56) References Cited

U.S. PATENT DOCUMENTS 3,619,885 A * 11/1971 Dischler .............. H01R 43/042 29/745
4,028,756 A * 6/1977 Couto .................. H01R 43/042 30/90.1
4,637,084 A * 1/1987 Wood ................. H01R 43/0421 72/409.14
7,882,722 B2 * 2/2011 Lefavour ............... B21D 39/04 72/416
11,641,084 B2 * 5/2023 Wason ................. B21D 39/048 72/453.16
2017/0317461 A1 11/2017 Wason et al.

FOREIGN PATENT DOCUMENTS

EP 0860245 8/1998

OTHER PUBLICATIONS

International Search Report and Written Opinion dated Nov. 7, 2019 in corresponding PCT/US2019/47085 (15 pages).

(Continued)

*Primary Examiner* — Phuong Chi Thi Nguyen
(74) *Attorney, Agent, or Firm* — Wissing Miller LLP

(57) ABSTRACT

An in-line portable, handheld hydraulic scissor-type action crimping tool having a handle assembly and a working head assembly is provided. The handle assembly has a tool frame portion and a neck portion. The working head assembly has a pair of jaw members joined so that they are movable relative to each other and held in place by a locking pin. One jaw member has a nest secured to or directly formed into the jaw member. The other jaw member has an indentor secured to or directly formed into the jaw member.

20 Claims, 23 Drawing Sheets

(56) References Cited

OTHER PUBLICATIONS

Greenlee Tools, Inc., Next Generation Tools, brochure, pp. 22-27, Aug. 2018 (48 pages).
Greenlee Textron Inc, Next Generation, brochure, pp. 21-23, Sep. 2016 (40 pages).
International Preliminary Report on Patentability mailed in PCT/US2019/047085 on Mar. 4, 2021 (14 pages).

* cited by examiner

Fig. 8
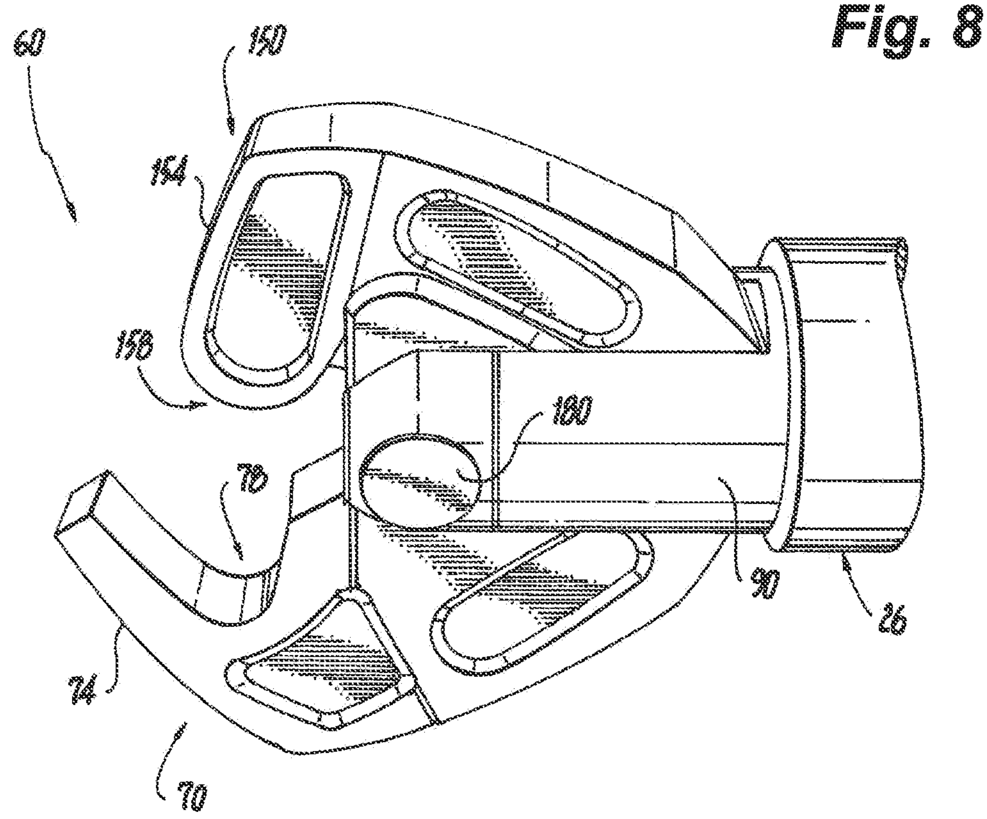
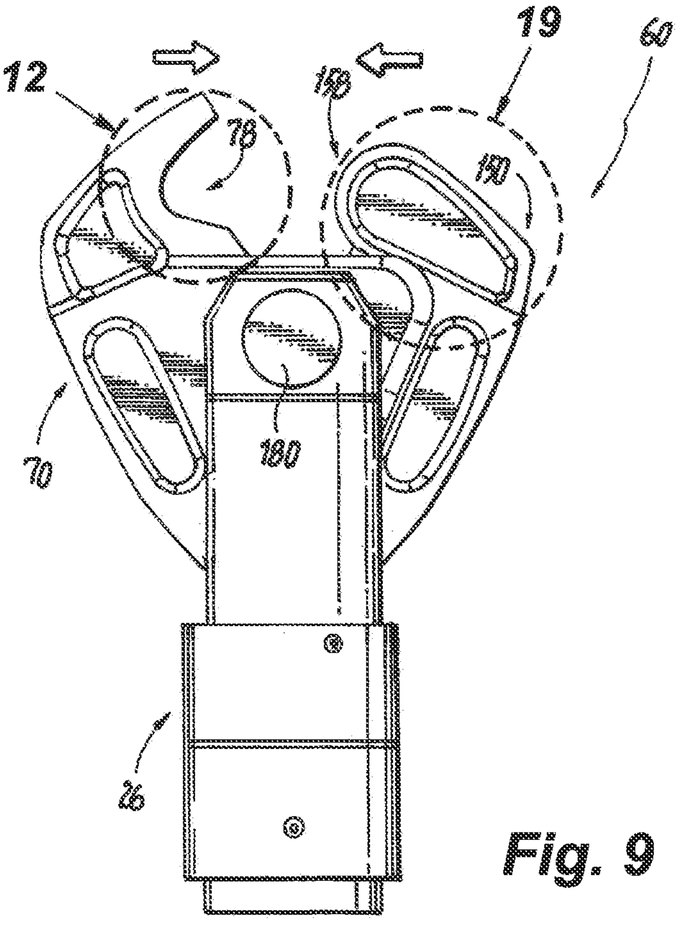
Fig. 9

Fig. 10
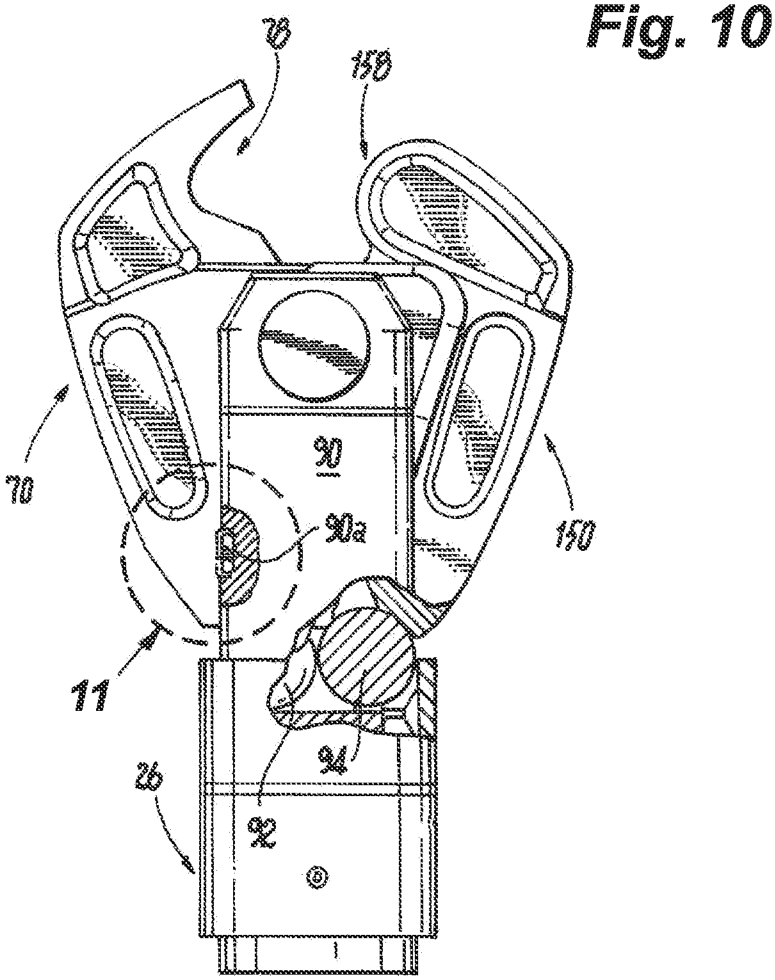
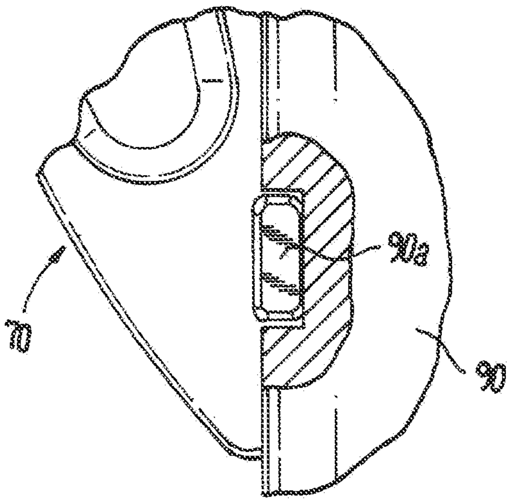
Fig. 11

Fig. 44
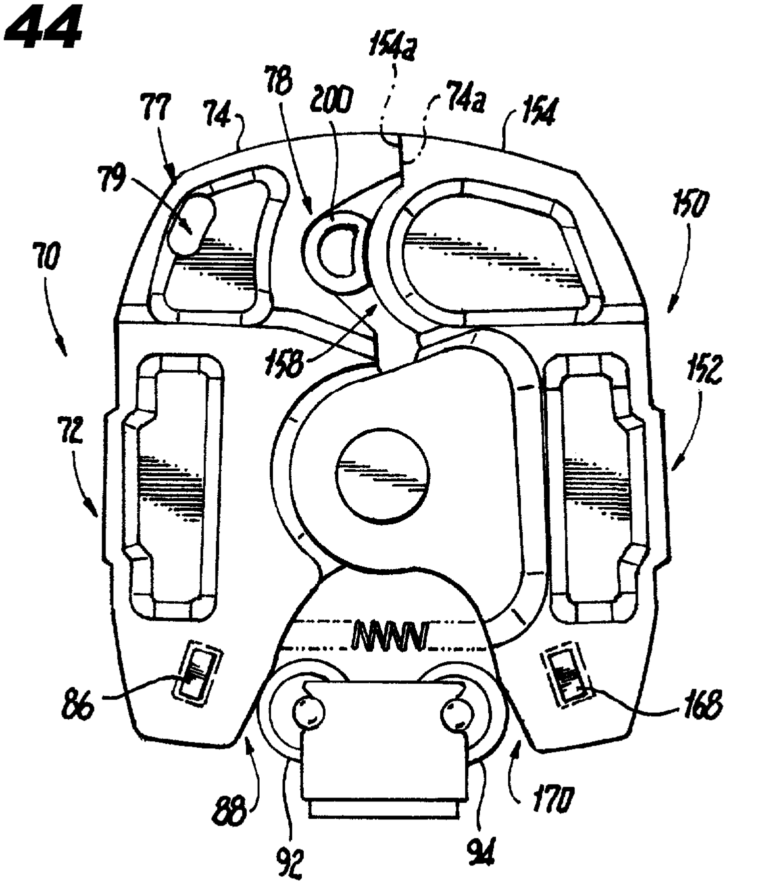
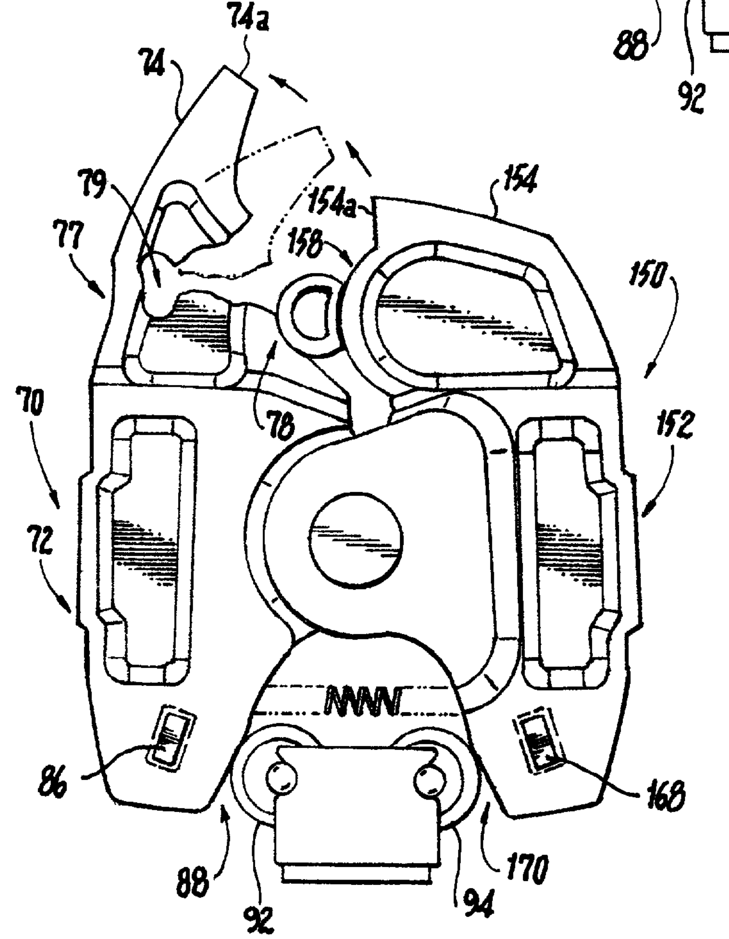
Fig. 45

Fig. 46
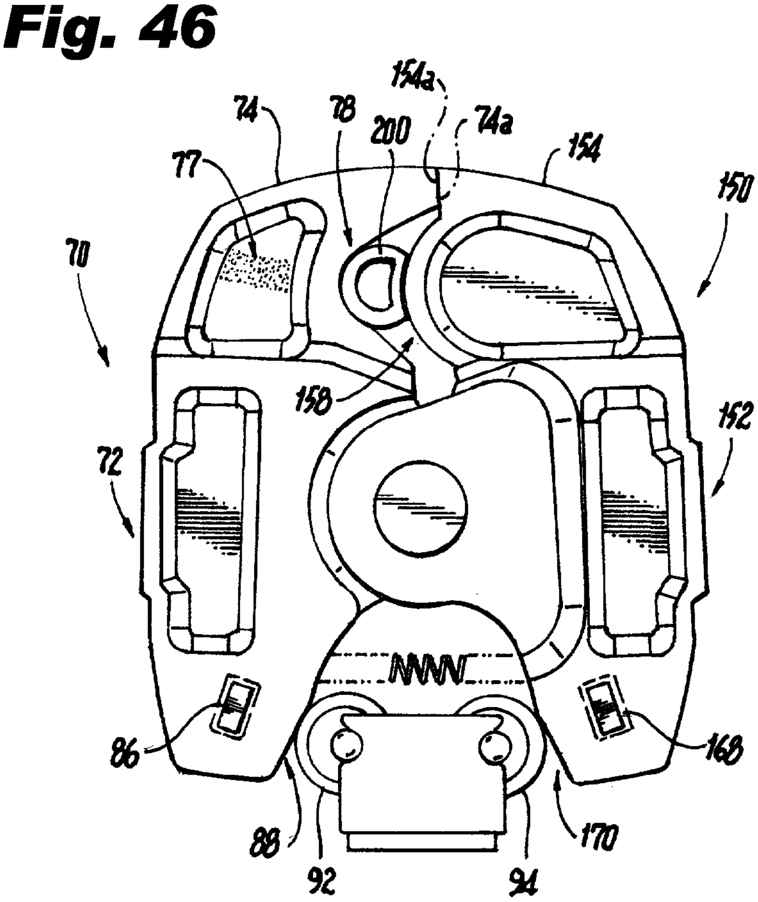
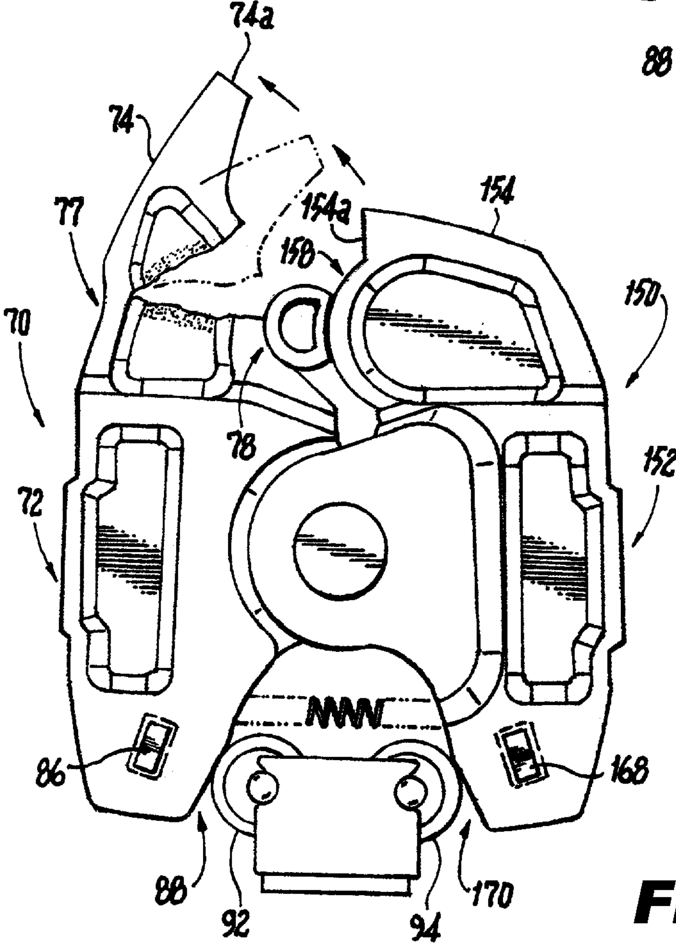
Fig. 47

PORTABLE IN-LINE DIELESS CRIMPING TOOL

CROSS-REFERENCED TO RELATED APPLICATIONS

This application is a continuation of co-pending U.S. patent application Ser. No. 16/544,620 filed on Aug. 19, 2019, and claims benefit from U.S. Provisional Patent Application No. 62/719,897 filed on Aug. 20, 2018 the contents of each are incorporated herein in their entirety by reference.

BACKGROUND

Field

The present disclosure relates to cooperating jaws and to hydraulic tools having cooperating jaws. More particularly, the present disclosure relates to hydraulic, hand-held crimping tool with a dieless jaw assembly for crimping a conductor, cable or wire to a termination.

Description of the Related Art

Hand-held in-line hydraulic tools are known in the art. These tools use cooperating jaws with removable dies that are hydraulically pressed together with great force to crimp a conductor to a termination. These tools may be battery-powered to allow mobility and portability for the user. These tools typically employ a scissor action to cause the cooperating jaws to be pressed together.

SUMMARY

The present disclosure provides exemplary embodiments of portable, handheld hydraulic tools with a dieless jaw assembly. For example, the portable, handheld hydraulic tool may be an in-line portable, handheld hydraulic crimping tool having an in-line handle assembly and a working head assembly. As another example, the portable, handheld hydraulic tool may be an in-line portable, handheld hydraulic cutting tool having an in-line handle assembly and a working head assembly. The handle assembly has a tool frame portion and a neck portion. The working head assembly has a pair of jaw members joined so that they are pivotable or movable relative to each other and held in place by a locking pin. For a crimping tool, one jaw member has a nest to receive a barrel of a termination and the other jaw member has an indentor used to crimp a conductor to the termination. For a cutting tool, one jaw member has a first cutting blade and the other jaw member has a second cutting blade.

In one exemplary embodiment, the present disclosure includes a working head assembly for a hydraulic crimping tool. The working head assembly includes a first jaw member, a second jaw member, a spring and a locking pin. The first jaw member has a proximal end portion and a distal end portion. The distal end portion includes a nest integrally or monolithically formed into the jaw member or secured to the jaw member, and the proximal end portion has one or more bores. The second jaw member has a proximal end portion and a distal end portion. The distal end portion of the second jaw member includes an indentor integrally or monolithically formed into the jaw member or secured to the jaw member, and the proximal end portion has one or more bores which when aligned with the one or more bores of the first jaw member defined a pivot point. The spring has a first end attached to the proximal end portion of the first jaw member and a second end attached to the proximal end portion of the second jaw member. The spring normally biases the proximal end of the first jaw member toward the proximal end of the second jaw member. The locking pin can extend through the one or more bores in the first jaw member and the one or more bores in the second jaw member when the bores are aligned to operatively couple the first jaw member to the second jaw member.

In an exemplary embodiment, a crimping tool includes a handle assembly and a working head assembly. The working head assembly includes a first jaw member, a second jaw member, a spring and a locking pin. The first jaw member includes a proximal end portion and a distal end portion. The distal end portion has a nest. The first jaw member has at least one bore. The second jaw member includes a proximal end portion and a distal end portion. The distal end portion includes an indentor. The second jaw member has at least one bore which when aligned with the at least one bore of the first jaw member defines a pivot point. The has a first end attached to the proximal end portion of the first jaw member and a second end attached to the proximal end portion of the second jaw member. The spring normally biases the proximal end portion of the first jaw member toward the proximal end of the second jaw member. The locking pin extends through the at least one bore in the first jaw member and the at least one bore in the second jaw member when the bores are aligned to releasably couple the first jaw member to the second jaw member;

The various advantages, aspects and features of the various embodiments of the present disclosure and claimed herein should become evident to a person of ordinary skill in the art given the following enabling description and drawings. The aspects and features disclosed herein are believed to be novel and other elements characteristic of the various embodiments of the invention are set forth with particularity in the appended claims. The drawings are for illustration purposes only and are not drawn to scale unless otherwise indicated. The drawings are not intended to limit the scope of the invention despite depicting a presently preferred embodiment of the invention. The following enabling disclosure is directed to one of ordinary skill in the art and presupposes that those aspects of the invention within the ability of the ordinarily skilled artisan are understood and appreciated.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 8 is a flat perspective view of the working head assembly of FIG. 1, illustrating a nest associated with a first jaw member and an indentor associated with a second jaw member of the working head assembly;

FIG. 9 is a side elevation view of the working head assembly of FIG. 8;

FIG. 10 is side elevation view in partial cut-away of the first side of the working head assembly of the tool of FIG. 1 in an open position and releasably secured to a yoke of the handle assembly;

FIG. 11 is an enlarged view of a portion of the working head assembly and yoke of the handle assembly of FIG. 10 taken from detail 11.

FIG. 44 is a side elevation view of the crimping jaws of FIG. 43 in a crimping position with a termination positioned within a nest of a crimping jaw, illustrating an exemplary embodiment of a hinge region that permits the crimping jaws to absorb a failure of the nest when the crimping jaws are in the crimping position;

FIG. 45 is a side elevation view of the crimping jaws of FIG. 44 illustrating a failure of the nest and the hinge region absorbing the failure;

FIG. 46 is a side elevation view of the crimping jaws of FIG. 43 in a crimping position with a termination positioned within a nest of a crimping jaw, illustrating another exemplary embodiment of a hinge region that permits the crimping jaws to absorb a failure of the nest when the crimping jaws are in the crimping position;

FIG. 47 is a side elevation view of the crimping jaws of FIG. 46 illustrating a failure of the nest and the hinge region absorbing the failure;

DETAILED DESCRIPTION

The present disclosure provides embodiments of portable, battery-powered, in-line, hand-held hydraulic tools where crimping jaws of the tools can be interchanged with cutting jaws. The present disclosure will be shown and described in connection with portable, battery-powered, in-line, hand-held hydraulic crimping tools. For ease of description, the portable, battery-powered, in-line, hydraulic crimping tools according to the present disclosure may also be referred to as the "tools" in the plural and the "tool" in the singular. The conductors, cables, wires or other objects to be crimped to a termination by the tool of the present disclosure may also be referred to collectively as the "conductors" in the plural and the "conductor" in the singular. The terminations include all types of crimp terminations, such as lugs, contacts, splices, butt splices, male quick disconnect terminals, and female quick disconnect terminals, etc. In addition, as used in the present disclosure, the terms "front," "rear," "upper," "lower," "upwardly," "downwardly," and other orientation descriptors are intended to facilitate the description of the exemplary embodiments disclosed herein and are not intended to limit the structure of the exemplary embodiments or limit the claims to any particular position or orientation.

Figure 1:
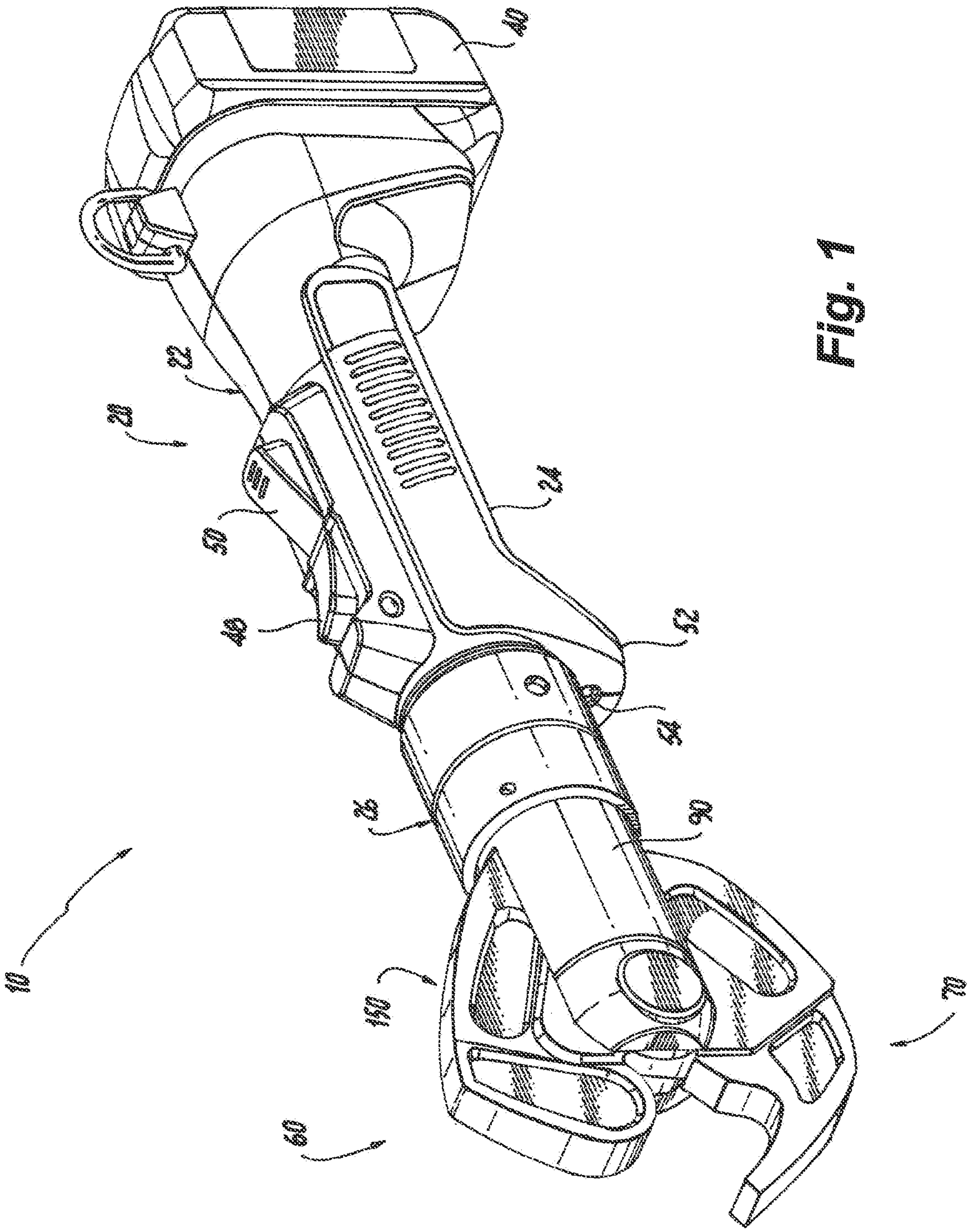
FIG. 1 is a perspective view of an exemplary embodiment of a tool according to the present disclosure, illustrating a working head assembly having crimping jaws and an in-line type handle assembly.
Figure 2:
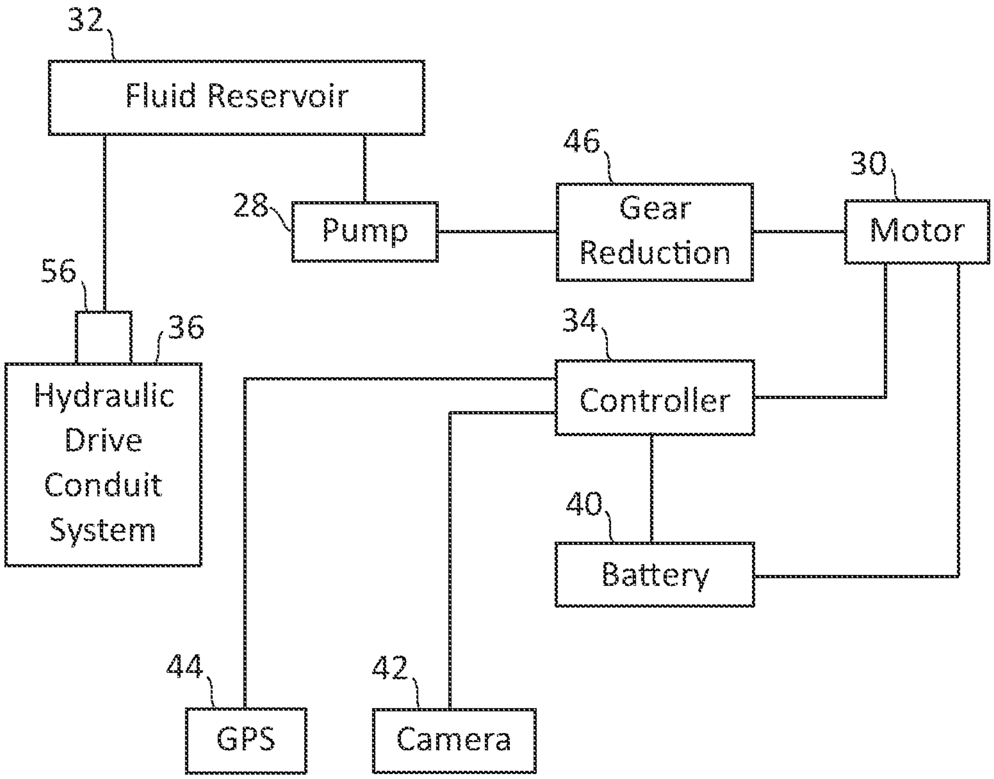
FIG. 2 is an exemplary block diagram for describing various parts of the tool shown in FIG. 1.
Figure 3:
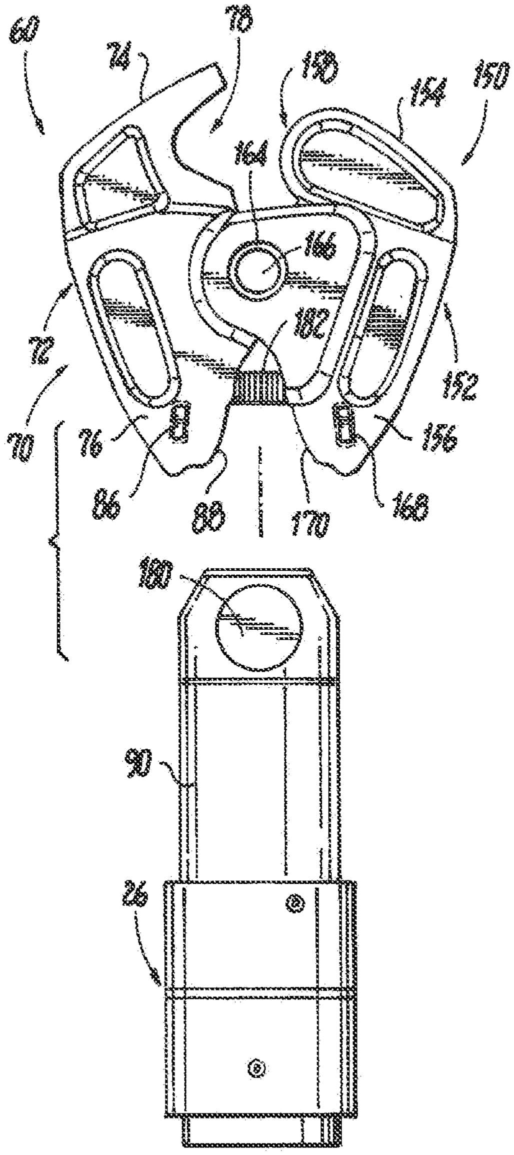
FIG. 3 is a side elevation view of a first side of the tool of FIG. 1 with the working head assembly separated from a yoke of the handle assembly.
Figure 4:
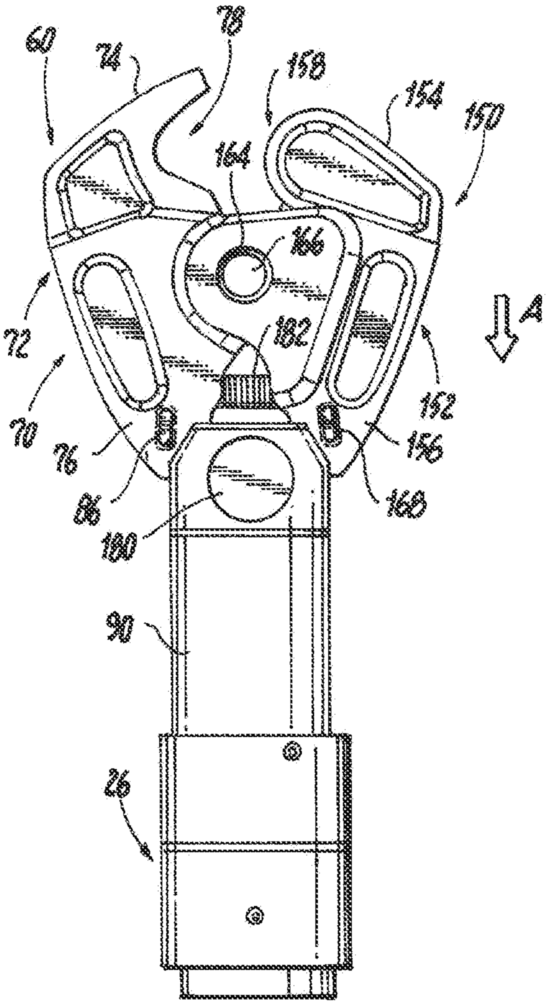
FIG. 4 is a side elevation view of the first side of the tool of FIG. 1 with the working head assembly moving toward and engaging the yoke of the handle assembly.
Figure 5:
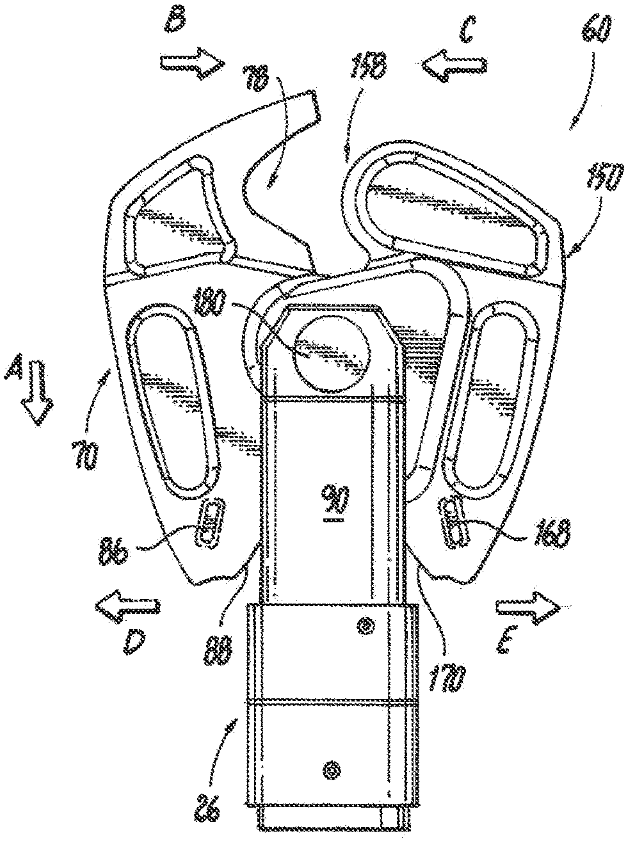
FIG. 5 is a side elevation view of the first side of the tool of FIG. 1 with the working head assembly engaging the yoke of the handle assembly, and illustrating a distal end of jaws of the working head assembly being moved toward each other.

Referring to FIGS. 1 and 2, a battery-powered, handheld hydraulic tool 10 includes a handle assembly 20 that houses the hydraulic and electrical controls for the tool, seen in FIG. 2, and a working head assembly 60 that is operatively connected to the handle assembly 20. The handle assembly 20 includes a tool frame 22, a pump 28, a motor 30, a fluid reservoir 32, a controller 34, a hydraulic drive conduit system 36 and a battery 40. The tool frame 22 includes a hand grip portion 24 and a neck portion 26 in an in-line type shape that utilizes a scissor-type crimping operation. However, the tool frame 22 could be in any suitable type of shape, such as, for example, a pistol like shape or a suitcase type shape that utilizes a scissor-type crimping operation.

The pump 28, motor 30, fluid reservoir 32, controller 34 and hydraulic drive conduit system 36 are located within the grip portion 24 of the tool frame 22 and are shown schematically in FIG. 2. The tool 10 may also include a camera 42, shown schematically in FIG. 2, mounted to the tool frame 22 and oriented to provide a video of a working area of the working head assembly 60. The tool 10 may also include a tool tracking system 44, shown schematically in FIG. 2, for tracking the location of the tool. In an exemplary embodiment, the tool tracking system 44 may include known GPS tracking components that receive GPS satellite signals and transmit the location of the tool to a remote station or mobile device allowing a user to track the location of the tool. Such transmissions to remote stations may be achieved using known communication systems, such as for example, cellphone networks.

In this exemplary embodiment, the battery 40 is removably connected to one end of the grip portion 24 of the tool frame 22. However, in another embodiment, the battery 40 could be removably mounted or connected to any suitable position on the tool frame 22. In another embodiment, the battery 40 may be affixed to the tool 10 so that it is not removable. The battery 40 shown is a rechargeable battery, such as a lithium ion battery, that can output a voltage of at least 16 VDC, and preferably in the range of between about 16 VDC and about 24 VDC. In the exemplary embodiment shown in FIG. 1, the battery 40 can output a voltage of about 18 VDC.

Continuing to refer to FIGS. 1 and 2, the motor 30 is coupled to the battery 40 and the controller 34, and its operation is controlled by the controller 34. Generally, the motor 30 is adapted to operate at a nominal voltage corresponding to the voltage of the battery 40, e.g., between about 16 VDC and about 24 VDC. For example, if the battery 40 is adapted to output a voltage of about 18 VDC, then the motor 30 would be adapted to operate at a voltage of about 18 VDC. Under a no-load condition, such a motor 30 can operate at about 21,000 rpm with a current of about 2.7 amps. At maximum efficiency, the motor 30 can operate at about 15,000 rpm with a current of about 12 amps, a torque of about 75 mN-m, and an output of about 165 W. An example of such an 18 VDC motor 30 is the RS-550VC-7030 motor, manufactured by Mabuchi Motor Co., Ltd. of Chiba-ken, Japan. However, as noted above, any suitable type of motor adapted to operate at or above a 16 VDC nominal voltage could be used. As another example, the motor may be a motor adapted to operate at a 24 VDC nominal voltage. The output shaft of the motor 30 is connected to the pump 28 by a gear reduction assembly or gearbox 46, shown schematically in FIG. 2. Any suitable type of gear reduction assembly 46 could be used.

The grip portion 24 of the tool frame 22 includes one or more operator controls, such as switches 48 and 50, which can be manually activated by an operator. The grip portion 24 of the tool frame 22 may include a hand guard or hilt 52 that can protect an operator's hand while operating the tool 10. The hilt 52 may include a light 54, e.g., an LED, that is operatively connected to the controller 34 such that when a switch 48 or 50 is actuated the light activates to illuminate the working area of the working head assembly 60. According to an embodiment of the present disclosure, one of the switches (e.g., switch 48) may be used to activate a piston (not shown) associated with the hydraulic drive system to activate the working head assembly 60 such that the work head assembly moves from a home position (or open position), seen in FIG. 8, toward a crimping position, seen in FIG. 28. The other switch (e.g., switch 50) may be used to retract the piston so that the working head assembly 60 moves from the crimping position to the home position. The operator controls, e.g., switches 48 and 50, are operably coupled to the controller 34.

The tool 10 may include a poppet valve 56, shown schematically in FIG. 2, connected to the hydraulic drive conduit system 36. The poppet valve 56 is adapted to open when the conduit system 36 reaches a predetermined minimum hydraulic pressure threshold, such as about 6,500 psi. When the poppet valve opens, hydraulic fluid being pumped by the pump 28 can exit the conduit system 36 and return to the fluid reservoir 32. The poppet valve 56 can be adapted to generate an audible sound when it opens. This audible sound can signal to the operator that the tool 10 has reached its maximum predetermined hydraulic pressure and, thus, the action of the working head assembly 60, e.g., a crimping operation or crimping action, is completed.

In the exemplary embodiment shown in FIG. 2, the controller 36 is adapted to sense a current drop of electricity to the motor 30. When the poppet valve 56 opens, resistance to rotation of the motor 30 is reduced such that the motor draws less current. The controller 36 senses this current drop via a current sensor (not shown), and automatically deactivates the motor 30 for a predetermined period of time. In one embodiment, the predetermined period of time is between about 2 seconds and about 3 seconds. However, any suitable predetermined period of time could be set. In another embodiment, the controller 34 could be adapted to deactivate the motor 30 until a reset button or reset like procedure is performed by the operator. With this type of system, an operator can sense via tactile feedback that the motor 30 and pump 28 have stopped and would not need to rely on an audible signal being heard or a visual signal from an LED positioned on the tool 10.

In an exemplary embodiment, the working head assembly 60 includes a pair of cooperating jaw members; a first jaw member 70 and second jaw member 150. As shown in FIGS. 3-7, the first jaw member 70 includes a body 72 having a distal end portion 74 and a proximal end portion 76. In the crimping tool embodiments, the distal end portion 74 includes a nest 78 used during a crimping operation. The nest 78 may be integrally or monolithically formed into the distal end portion 74 so that it is in a fixed position, or the nest 78 may be a separate member that is permanently or releasably secured to the distal end portion 74 using, for example, welds, mechanical fasteners or spring locking fasteners. In the event the nest 78 is a separate member, the nest may be in a fixed position or movable relative to the body 72. Similarly, the second jaw member 150 includes a body 152 having a distal end portion 154 and a proximal end portion 156. The distal end portion 154 includes an indentor 158 used during a crimping operation. The indentor 158 may be integrally or monolithically formed into the distal end portion 154 so that it is in a fixed position, or the indentor 158 may be a separate member that is permanently or releasably secured to the distal end portion 154 using, for example, welds, mechanical fasteners or spring locking fasteners. In the event the indentor 158 is a separate member, the indentor may be in a fixed position or movable relative to the body 152. In this exemplary embodiment, the indentor 158 includes an arcuate shaped impacting surface 158*a*, seen in FIG. 7, that is sufficiently rigid to impact a barrel portion of a termination positioned within the nest and deform the barrel portion of the termination.

It is noted that in the cutting tool embodiments, the distal end portion 74 of the body 72 includes a cutting blade instead of a nest, and the distal end portion 154 of the body 152 includes a cutting blade instead of an indentor. An example of jaws for an in-line tool with cutting blades is described in commonly owned U.S. application Ser. No. 16/378,992 filed on Apr. 9, 2019, which is incorporated herein in its entirety by reference.

Figure 7:
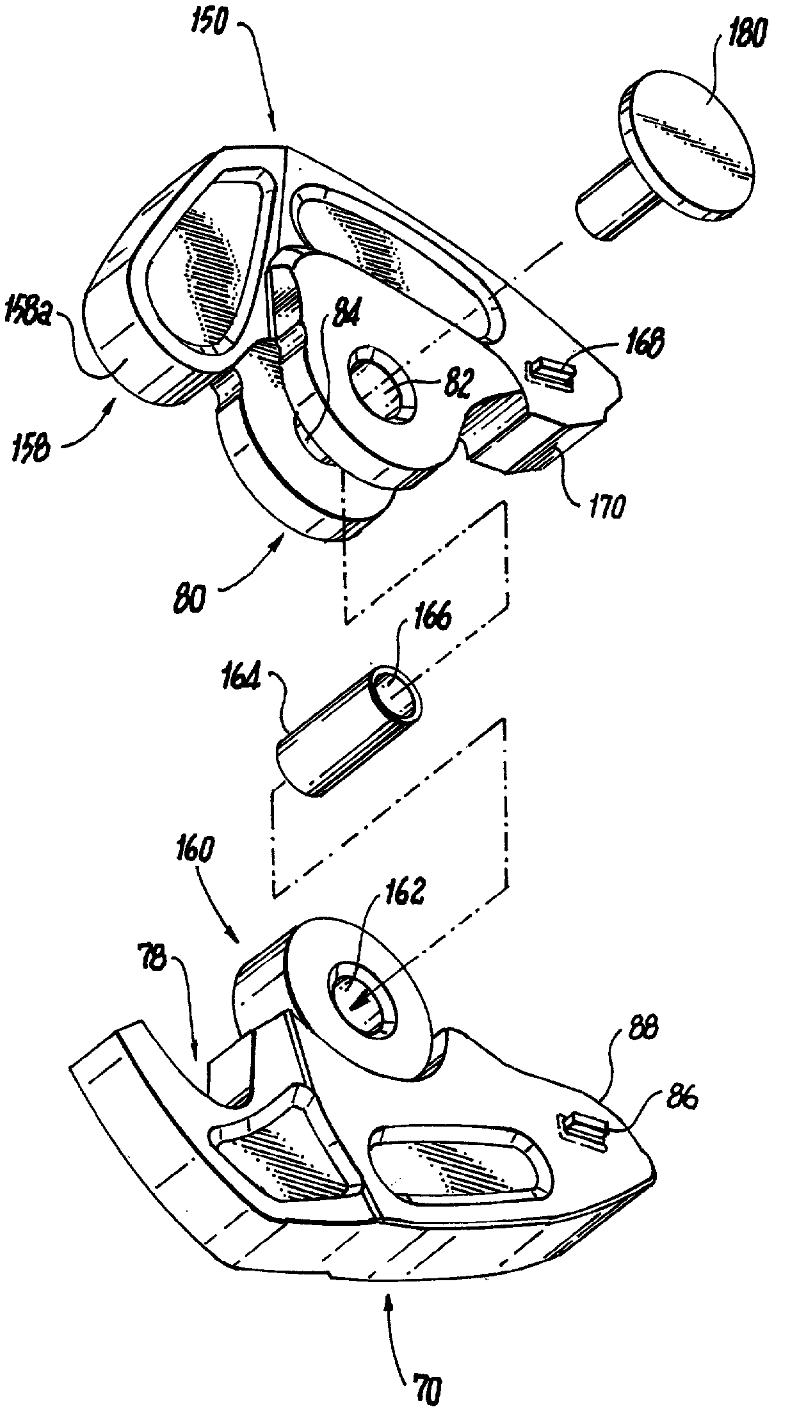
FIG. 7 is an exploded perspective view of the working head assembly of FIG. 3.
Figure 12:
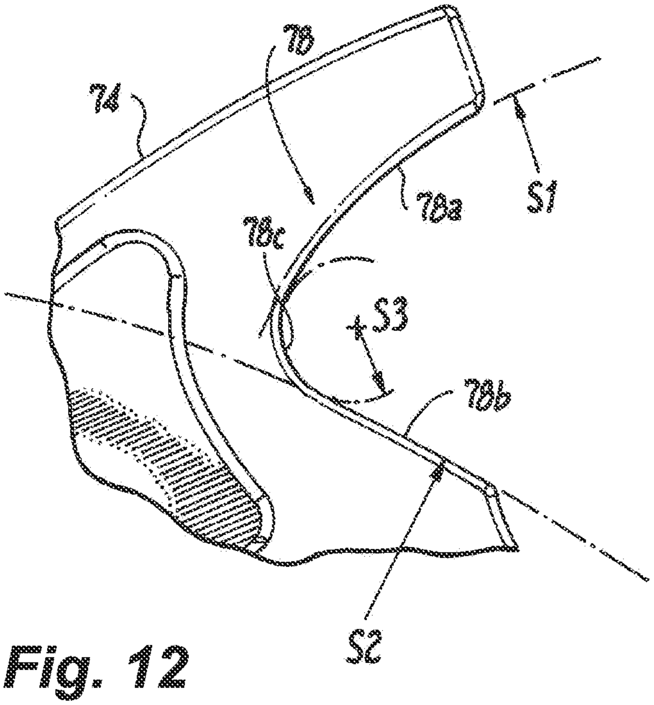
FIG. 12 is a side elevation view of the nest of the first jaw member illustrating a geometry of the nest.

Referring to FIG. 7, the jaw members 70 and 150 can be connected to one another using a number of known mechanical configurations. As non-limiting examples, jaw members 70 and 150 can be connected to one another using a tongue in groove type configuration or a clevis, tang and pin type configuration. In the exemplary embodiment shown, the jaw members 70 and 150 are connected to one another using the clevis, tang and pin type configuration. More specifically, the second jaw member 150 includes a clevis 80 having bores 82 and 84 through the sides of the clevis 80, and the first jaw member 70 includes a tang 160 having a bore 162, as shown. In this configuration, to connect the jaw members 70 and 150 together, the tang 160 is positioned within the clevis 80. A sleeve or bushing 164 having a central opening 166 is disposed within the bores 82, 84 and 162, seen in FIG. 7. The sleeve 164 holds the two jaw members 70 and 150 together until a locking pin 180, seen in FIGS. 3 and 4, connects the jaw members 70 and 150 to the neck portion 26 of the handle assembly 20 of the tool 10. The sleeve 164 allows the locking pin 180 to slide through one continuous surface when connecting the jaw members 70 and 150 to the neck portion 26, which permits easier attachment of the jaw members 70 and 150 to the handle assembly 20. In other words, the sleeve 164 allows the locking pin 180 to glide through areas or seems where the jaw members 70 and 150 meet without catching on a jaw member in the event the jaw members are slightly offset, misaligned or have gaps. Additionally, the sleeve 164 keeps the jaw members 70 and 150 of the working head assembly 60 together for easier handling when the locking pin 180 is removed from the tool 10.

The jaw members 70 and 150 are configured to open and close relative to one another using, for example, the clevis, tang and locking pin type configuration. The jaw members 70 and 150 can open and close relative to one another between the home position and a fully seated position. The home position is a position where the jaw members are separated sufficiently to allow termination barrels to be inserted into the nest 78 of the first jaw member 70, as seen in FIG. 8. The fully seated position is a position of the jaw members when the indentor 158 of the second jaw member 150 is fully seated in the nest 78 of the first jaw member 70, as seen in FIG. 19A. As jaw members 70 and 150 move from the open position to the fully seated position, the jaw members can perform a crimping operation where the indentor 158 of the second jaw member 150 is in contact with a barrel of a termination and deforming the barrel of the termination with a force sufficient to crimp a conductor inserted into the barrel of the termination to the termination. Thus, when operating the tool 10, the indentor 158 does not have to travel to the fully seated position in order to crimp a conductor to a termination because of a number of factors, including the size of the termination and the size of the conductor. Thus, using the clevis and tang arrangement, for example, allows the jaw members 70 and 150 to pivot around sleeve 164 and the locking pin 180 such that the jaw members can move between the home position and the fully seated position. When moving the jaw members 70 and 150 to the home position, seen in FIG. 8, the jaw members pivot causing the nest 78 and indentor 158 to move away from each other to permit a barrel of a termination to be inserted between the nest 78 and indentor 158. When moving the jaw members 70 and 150 to the fully seated position, the jaw members pivot causing the nest 78 and indentor 158 to advance towards each other until the indentor 158 is fully seated in the nest 78, seen in FIG. 19A.

Using the clevis, tang and pin type configuration described herein (or the tongue-and-groove type configuration) allows the working head assembly 60 to maintain the forces acting on the jaw members 70 and 150 symmetrically as well as reduces the stress on the jaw members, so as to allow a smaller, lighter weight design of the working head assembly. Specifically, with the clevis, tang and pin type configuration (or the tongue-and-groove type configuration), all of the forces are symmetrically applied to the jaw members. In addition, this configuration allows for tighter tolerances to further enhance performance of the operating jaw members.

Referring again to FIGS. 3-7, the jaw members 70 and 150 are configured for easy connection to and removal from the handle assembly 20 of the tool 10. As shown, the proximal end portion 76 of the first jaw member 70 includes a raised tab 86 on one or both sides of the jaw member, and the proximal end portion 156 of the second jaw member 150 includes a raised tab 168 on one or both sides of the jaw member. The raised tabs 86 and 168 serve as stops. More specifically, the raised tabs 86 and 168 are preferably positioned to facilitate connecting the jaw members 70 and 150 of the working head assembly 60 to the handle assembly 20 by allowing the jaw members to only open an amount that results in the locking pin 180 being aligned with the central opening 166 of the sleeve 164, thus freeing the hands of a user when connecting the working head assembly 60 to the handle assembly 20 or when removing the working head assembly from the handle assembly. A user can now allow the pin 180 to be removed and, subsequently, the jaw members 70 and 150 to release and fall open, leaving the jaw members aligned. A more detailed description of connecting the jaw members 70 and 150 to the handle assembly 20 and removing the jaw members and from the handle assembly is described in commonly owned patent application Ser. No. 15/979,709 filed on May 15, 2018 which is incorporated herein in its entirety by reference.

Figure 6:
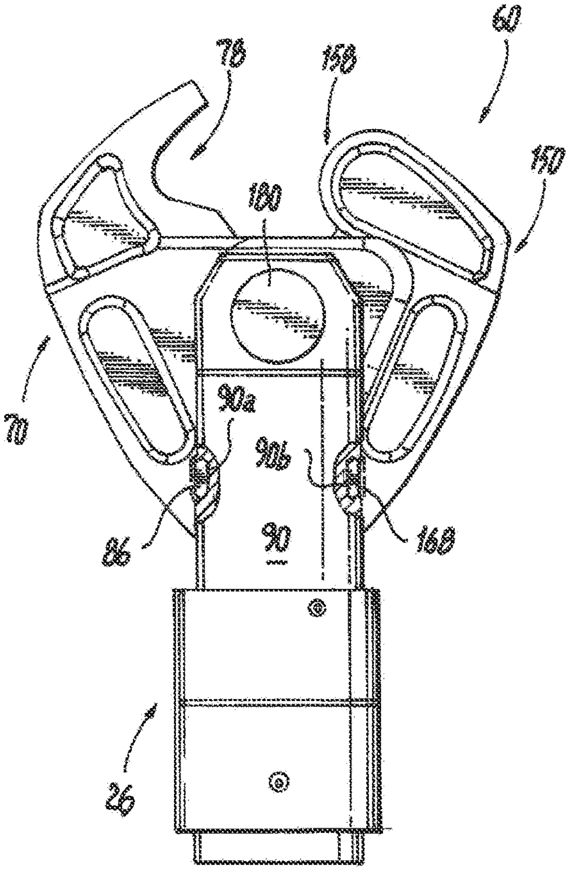
FIG. 6 is a side elevation view of the first side of the tool of FIG. 1 with the working head assembly fully engaged with the yoke of the handle assembly.

In addition, in the exemplary embodiment shown, each raised tab 86 and 168 is sized and configured to mate with a respective tab notch 90*a* and 90*b*, seen in FIGS. 6, 10 and 11, provided in an inner surface of a yoke 90 of the neck portion of the handle assembly 20, as is known, when attaching the jaw members 70 and 150 to the yoke 90. More specifically, when the raised tabs 86 and 168 are positioned in their respective tab notches 90*a* and 90*b* the bores in the jaw members 70 and 150 are aligned so that the sleeve 164 and locking pin 180 can connect the jaw members 70 and 150 to the yoke 90. This alignment allows one roller 92, seen in FIG. 21, positioned within the yoke 90 to maintain a slight distance from cam surface 88*a* on the first jaw member 70, and allows another roller 94, seen in FIG. 21, positioned within the yoke 90 to maintain a slight distance from with cam surface 170*a* on the second jaw member 150.

As noted above, the working head assembly 60 is releasably secured to the neck portion 26 of the handle assembly 20 via the locking pin 180, which is described in more detail in commonly owned patent application Ser. No. 15/979,709. When the raised tabs 86 and 168 are positioned into their respective tab notches 90*a* and 90*b*, the jaw members 70 and 150 are prevented from falling out of the yoke 90 of the neck portion 26 of the handle assembly 20 when the locking pin 180 is in an extended position. Additionally, when the locking pin 180 is in the extended position such that the locking pin 180 is removed from the bore 82 and 84 in jaw member 70 and the bore 162 in the jaw member 150, the jaw members not only remain connected to the yoke 90, but also tension from spring member 182, seen in FIG. 21, coupled between the distal end portions 76 and 156 of the jaw members 70 and 150, respectively, causes the raised tabs 86 and 168 to be held within the tab notches 90*a* and 90*b* in the yoke 90. One end of the spring member 182 is connected to the distal end portion 76 of the first jaw member 70 and the opposite end of the spring member 182 is connected to the distal end portion 156 of the second jaw member 150 by a connection accessed through spring pin holes (not shown) in the respective jaw member. As will be appreciated, the spring member 182 normally bias the jaw members 70 and 150 toward the open position. This allows the jaw 60 to remain attached to the yoke 90.

Figure 13:
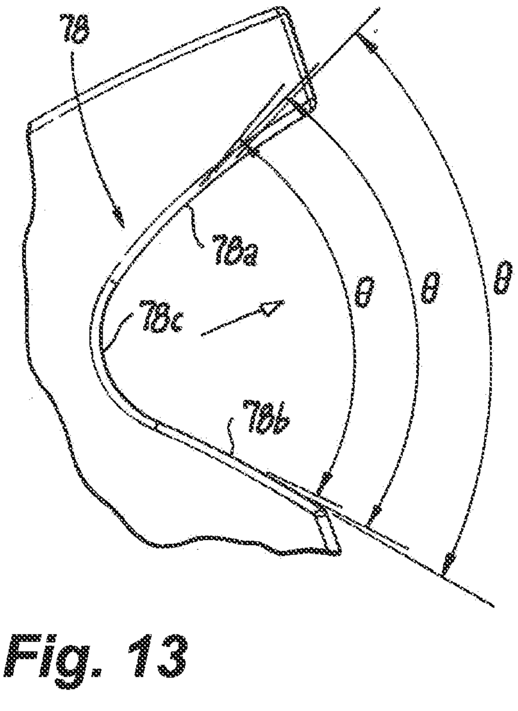
FIG. 13 is a side elevation view of the nest of the first jaw member similar to FIG. 12 and illustrating that an angle of receipt of a barrel of a termination is the same for different size terminations.
Figure 14:
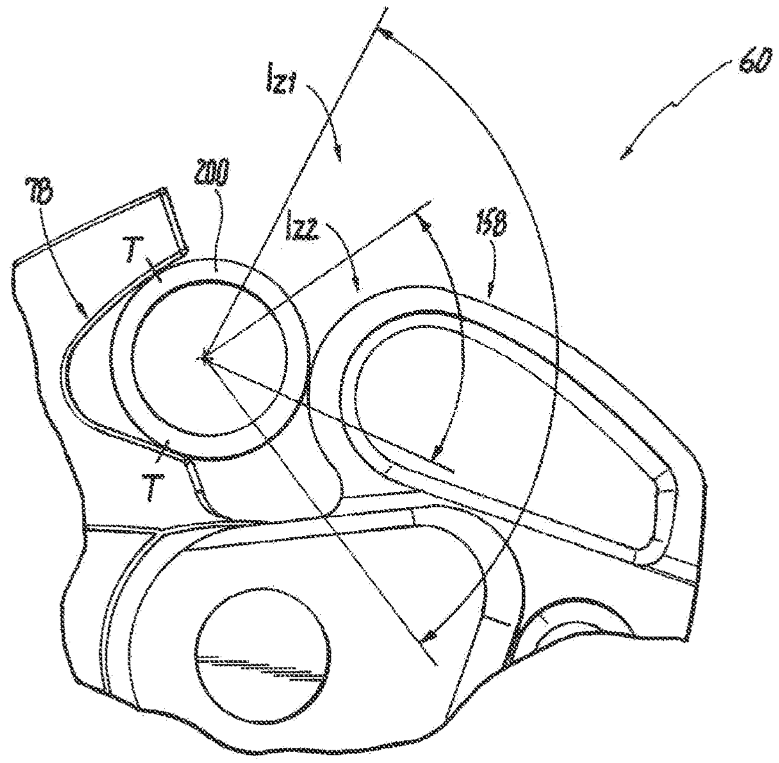
FIG. 14 is a side elevation view of the working head assembly of FIG. 1, illustrating a barrel of a large size termination resting in the nest of the first jaw member and the indentor of the second jaw member in contact with the termination, and illustrating a broad impact zone for the indentor to impact the barrel and a preferred impact zone.
Figure 15:
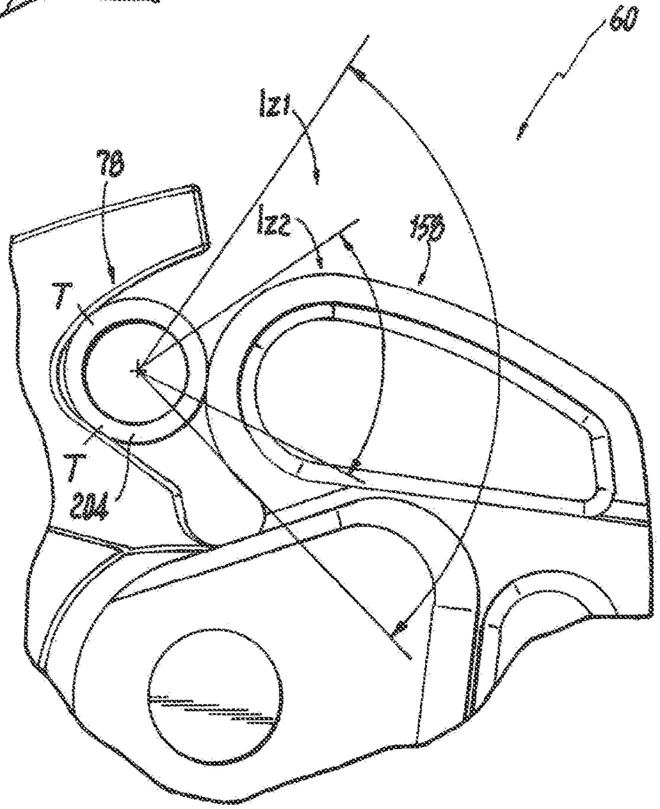
FIG. 15 is a side elevation view of the working head assembly of FIG. 1, illustrating a barrel of a small size termination resting in the nest of the first jaw member and the indentor of the second jaw member in contact with the termination, and illustrating the broad impact zone for the indentor to impact the barrel and the preferred impact zone.

Referring now to FIGS. 12-18, the nest 78 of the jaw member 70 will be described in more detail. The nest 78 has an asymmetric shape that compensates for distortion in the crimp as the jaw members move angularly or along an arc pattern from the home position toward the fully seated position. This angular motion or arc pattern forms the scissor action of the tool 10 and is based off the pivot point of the jaw members 70 and 150 about the locking pin 180. The asymmetric shape of the nest 78 is defined by three surfaces 78*a*, 78*b* and 78*c*, seen in FIG. 12. More specifically, the first surface 78*a* is a concave surface relative to a center of the nest, as shown by arc S1. The second surface 78*b* is a convex surface relative to a center of the nest, as shown by arc S2. The third surface 78*c* is a concave surface relative to a center of the nest, as shown by arc S3. The third surface 78*c* joins the first surface 78*a* to the second surface 78*b* and has a radius of curvature that is less than the radius of curvature of the first surface 78*a*. The surfaces 78*a*, 78*b* and 78*c* are oriented such that an angle "θ," seen in FIG. 13, extending between termination contact segments on the first surface 78*a* and corresponding termination contact segments on the second surface 78*b* remains constant. A termination contact segment on the first surface 78*a* and a corresponding termination contact segment on the second surface 78*b* are segments on the surfaces 78*a* and 78*b* where a termination barrel placed in the nest contacts the first and second surfaces 78*a* and 78*b*, as shown in FIG. 13. These corresponding termination contact segments may also be referred to herein as a "contact segment pair." By maintaining the angle "θ" constant for each contact segment pair along the first and second surfaces 78*a* and 78*b*, the impact of the indentor 158 against a barrel of a termination placed in the nest 78 occurs within a predefined impact zone "$I_{Z1}$" which is about 60 degrees relative to a center of a termination barrel placed in the nest 78. Preferably, the predefined impact zone is an impact zone "$I_{Z2}$" which in this exemplary embodiment is about 30 degrees, as seen in FIGS. 14 and 15.

Figure 16:
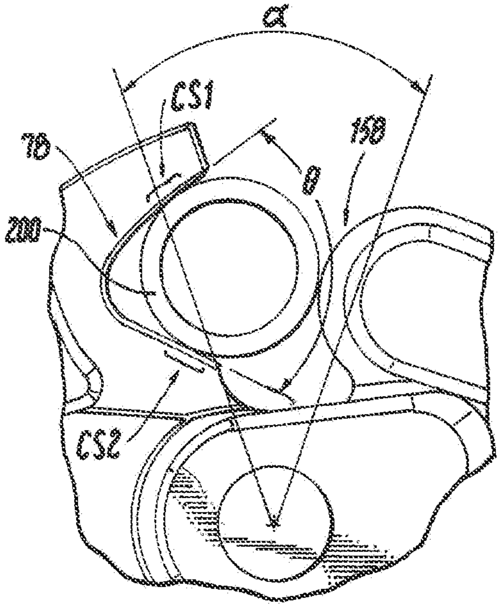
FIGS. 16-18 are side elevation views of the nest of FIG. 12 demonstrating that an angle of receipt of the barrel of the termination is the same for different size terminations and different closure angles.
Figure 17:
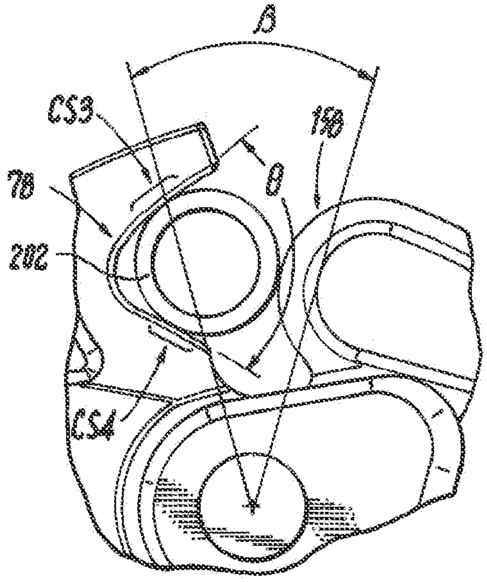
Figure 18:
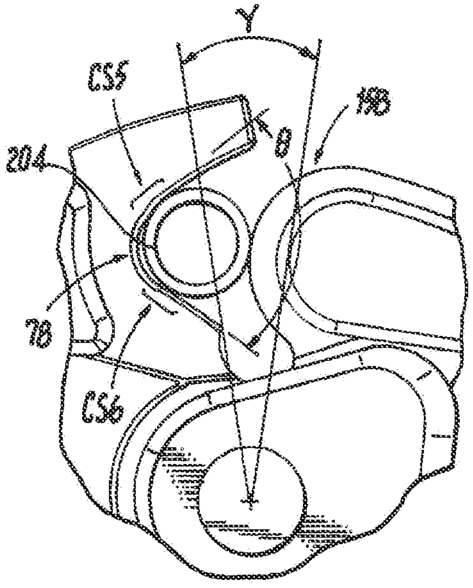

To illustrate and referring to FIGS. 14-16, if a termination 200 having a large diameter barrel is placed in the nest 78, the angle of closure "α" between the first jaw member 70 and the second jaw member 150 relative to the pivot point of the jaw members 70 and 150 results in an angle "θ" between termination contact segment CS1 on the first surface 78*a* and termination contact segment CS2 on the second surface 78*b*, as seen in FIG. 16. Similarly, if a termination 202 having a medium diameter barrel is placed in the nest 78, the angle of closure "β" between the first jaw member 70 and the second jaw member 150 relative to the pivot point of the jaw members 70 and 150 results in an angle "θ" between termination contact segment CS3 on the first surface 78*a* and termination contact segment CS4 on the second surface 78*b*, as seen in FIG. 17. Similarly, if a termination 204 having a small diameter barrel is placed in the nest 78, the angle of closure "γ" between the first jaw member 70 and the second jaw member 150 relative to the pivot point of the jaw members 70 and 150 results in an angle "θ" between termination contact segment CS5 on the first surface 78*a* and termination contact segment CS6 on the second surface 78*b*, as seen in FIG. 18.

Figure 19:
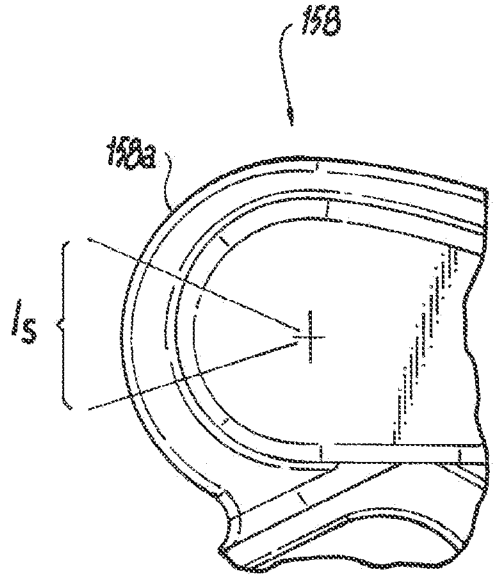
FIG. 19 is a side elevation view of the indentor of the second jaw member of the working head assembly according to the present disclosure.
Figure 19A:
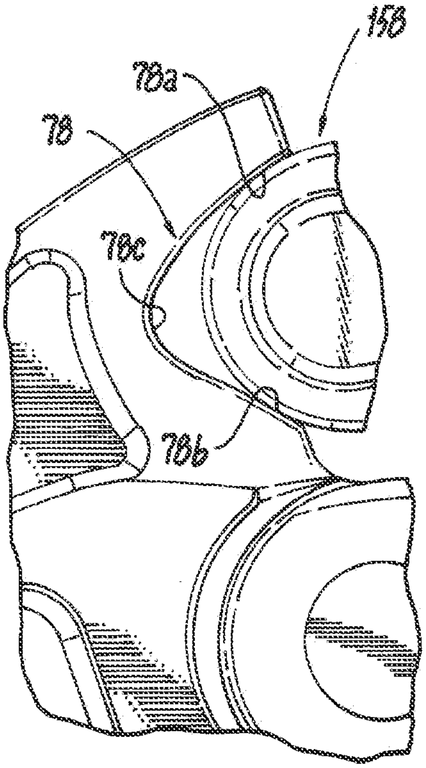
FIG. 19A is a side elevation view of the indentor of the second jaw member fully seated in the nest of the first jaw member.
Figure 20:
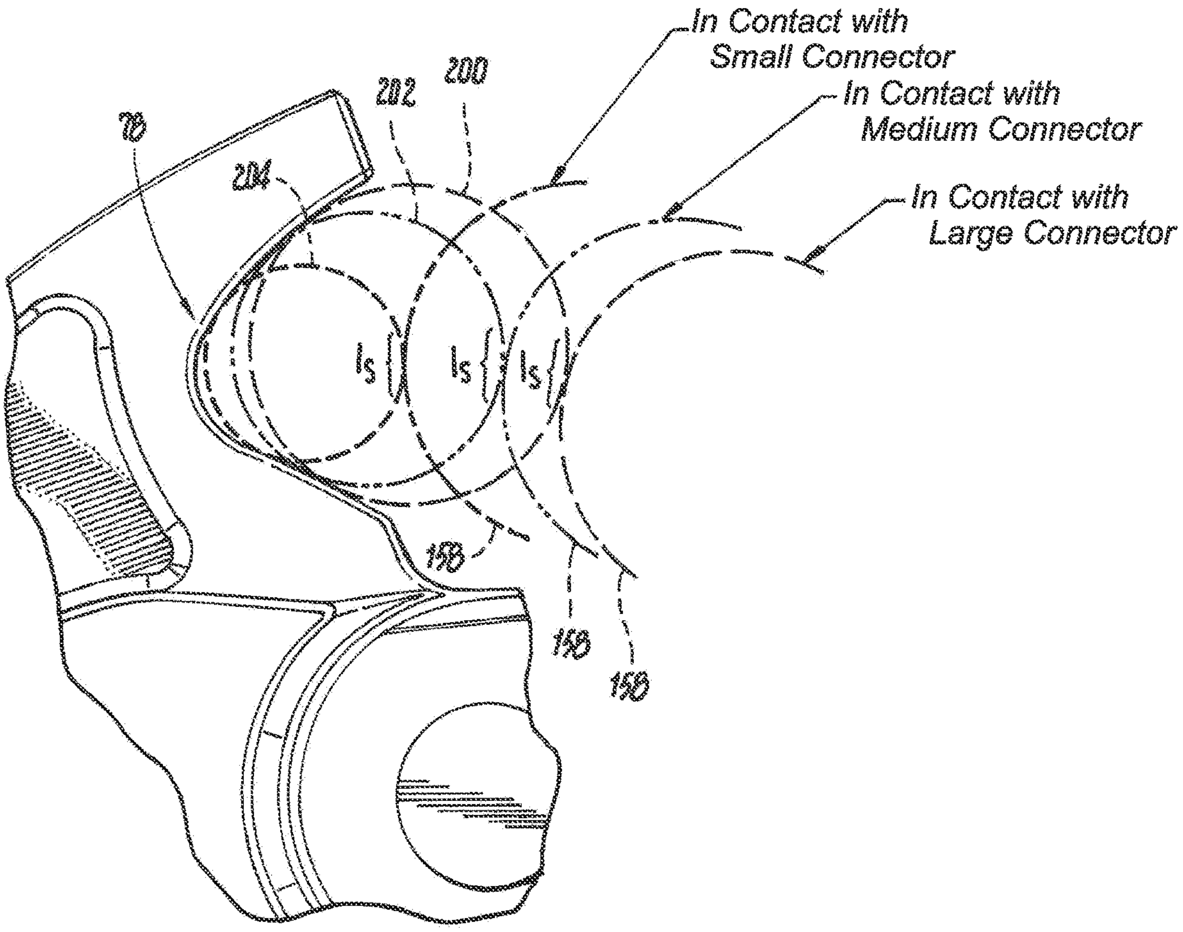
FIG. 20 is a schematic side elevation view illustrating points of contact between the indentor of FIG. 19A and terminations of various sizes placed within the nest.

Referring now to FIGS. 19, 19A and 20, the indentor 158 of the jaw member 150 will be described in more detail. As shown, the indentor 158 has a rounded surface 158*a*, seen in FIG. 19, and is configured so that when the jaw 60 is fully closed, the indentor 158 fits within the nest 78 so that it contacts the first surface 78*a* and the second surface 78*b* at a point adjacent the opening of the nest 78, as shown in FIG. 19A. The indentor 158 has an impact segment "$I_S$" which is the portion of the indentor that strikes or impacts a barrel of a termination placed within the nest 78. As seen in FIG. 20, the impact segment "$I_S$" remains substantially constant as the jaw members 70 and 150 move angularly or along their arc pattern from the home position to the crimp position. To illustrate, a termination 200 having a large diameter (shown as a dash line in FIG. 20) is impacted in the impact zone "$I_{Z1}$" by the impact segment "$I_S$" of the indentor 158 (shown as a dash line in FIG. 20). Similarly, a termination 202 having a medium diameter (shown as a dash-dot-dot-dash line in FIG. 20) is impacted in the impact zone "$I_{Z1}$" by the impact segment "$I_S$" of the indentor 158 (shown as a dash-dot-dot-dash line in FIG. 20). Similarly, a termination 204 having a large diameter (shown as a thick dash-dot-dot-dash line in FIG. 20) is impacted in the impact zone "$I_{Z1}$" by the impact segment "$I_S$" of the indentor 158 (shown in a thick dash-dot-dot-dash line in FIG. 20). It is noted that in the exemplary embodiment of FIG. 20, the impact segment "$I_S$" of the indentor 158 is also impacting the termination 200, 202 or 204 in the preferred impact zone "$I_{Z2}$."

Since the jaw members 70 and 150 of the present disclosure move angularly relative to each other when moving from the home position to the crimp position, the geometry of the nest 78 and the indentor 158 according to the present disclosure is configured so that nest-indentor relationship is substantially similar to a nest-indentor relationship of known linear nest-indentor configurations, where the nest is fixed and the indentor moves linearly relative to the fixed nest and impacts a barrel of a termination at a center of the barrel. In other words, the geometry of the nest 78 and the indentor 158 according to the present disclosure is such that the indentor 158 impacts the barrel of a termination (e.g., termination 200, 202 or 204) placed in the nest 78 at substantially the center of the barrel of the termination.

Turning now to FIGS. 21-24, in addition to the nest 78 and indentor 158 geometry of the jaw members 70 and 150, the present disclosure also contemplates a new geometry for the cam surface 88 of the first jaw member 70 and the cam surface 170 of the second jaw member 150. The geometry of the cam surfaces 88 and 170 is based upon a desired average crimping force of the jaw members 70 and 150. The geometry of the cam surfaces 88 and 170 is configured to provide a sufficient crimping force between the nest 78 and the indentor 158 so that a wide variety of sizes of terminations can be placed in the nest 78 and crimped by the indentor 158. Thus, the cam surfaces 88 and 170 can be used to establish the depth of crimp of the barrel of the termination after a crimping operation.

Figure 21:
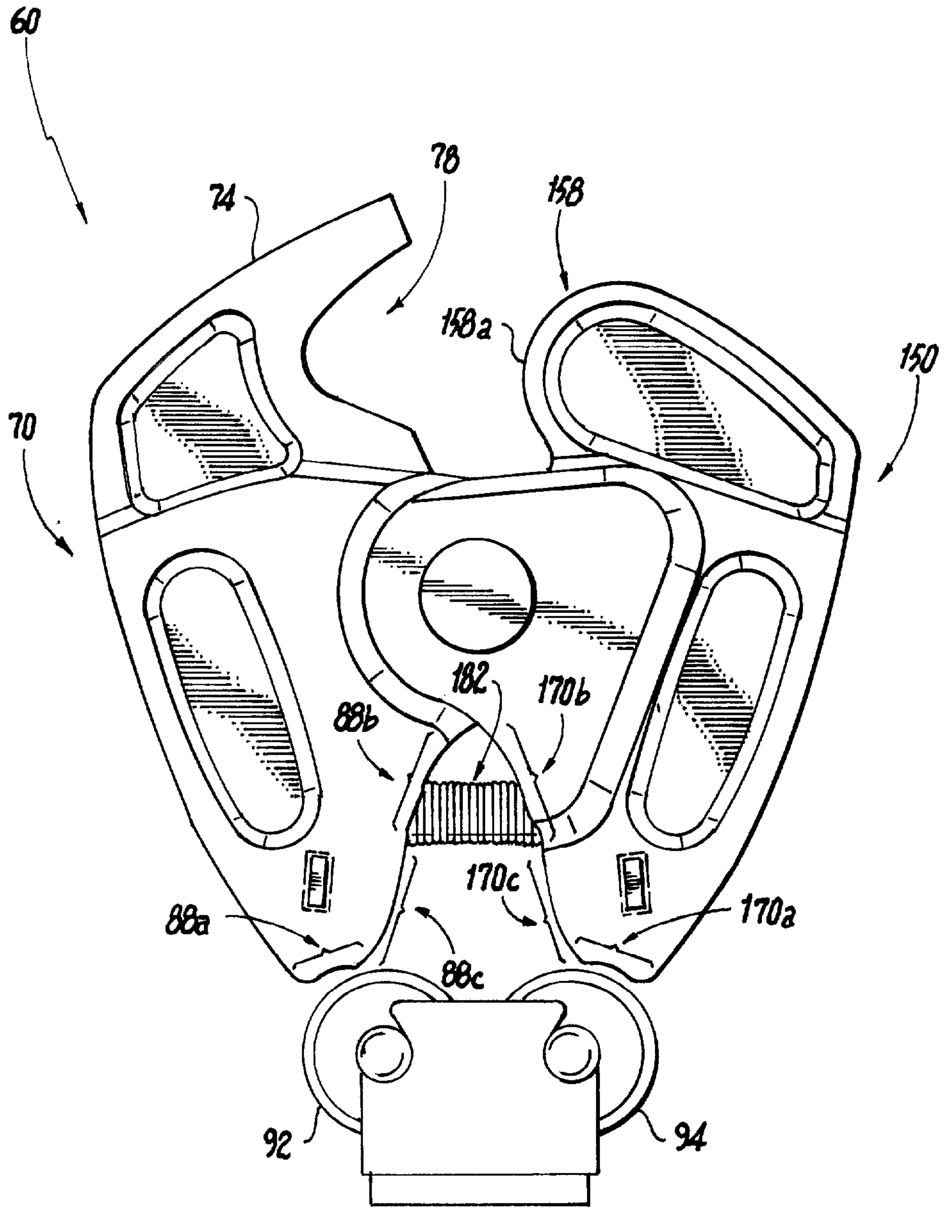
FIG. 21 is a side elevation view of the working head assembly of FIG. 1 and rollers of the handle assembly in contact with cam surfaces of each jaw member when the jaws are in a home position.
Figure 22A:
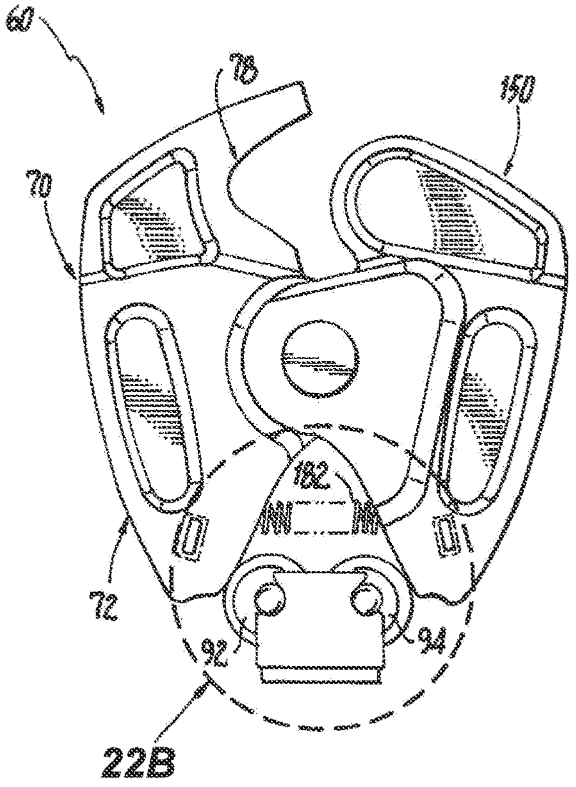
FIG. 22A is a side elevation view of the working head assembly of FIG. 21, illustrating the rollers of the handle assembly in contact with the cam surfaces of each jaw member at a point along a convex surface segment of the cam surfaces.
Figure 22B:
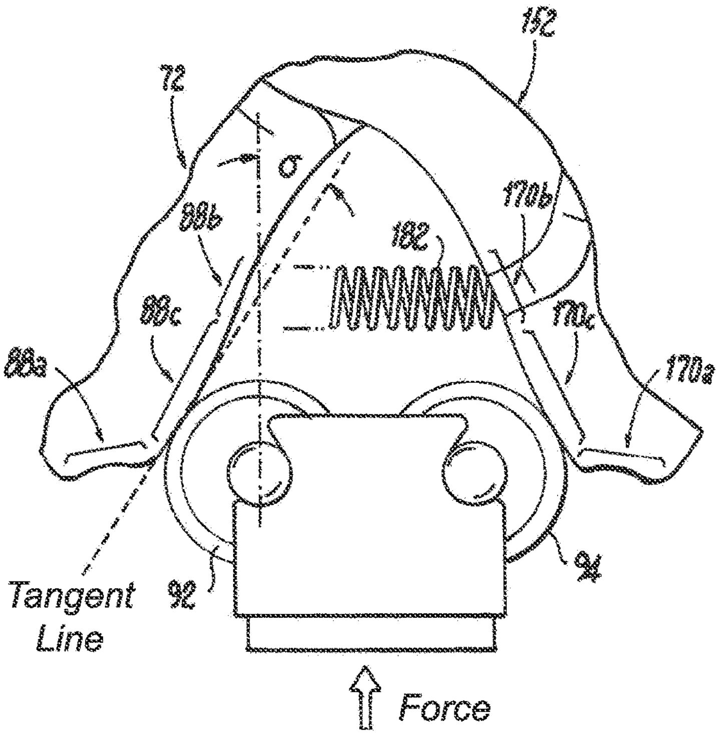
FIG. 22B is an enlarged side elevation view of the cam surfaces of each jaw member of the working head assembly of FIG. 22A taken from detail 22B, illustrating the rollers of the handle assembly in contact with cam surfaces of each jaw member at a point along the convex surface segment of the cam surfaces.
Figure 23A:
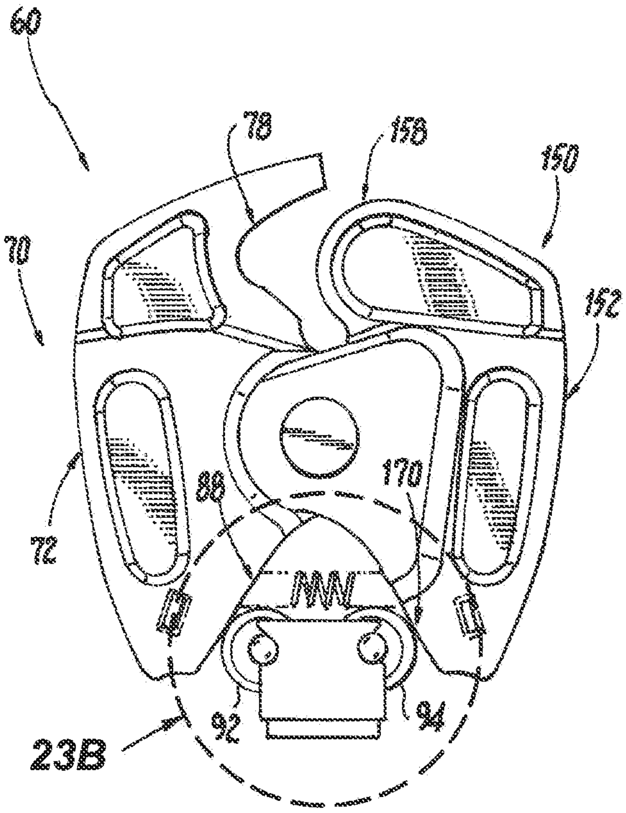
FIG. 23A is a side elevation view of the working head assembly of FIG. 21, illustrating the rollers of the handle assembly in contact with the cam surfaces of each jaw member at a point further along a convex surface segment of the cam surfaces.
Figure 23B:
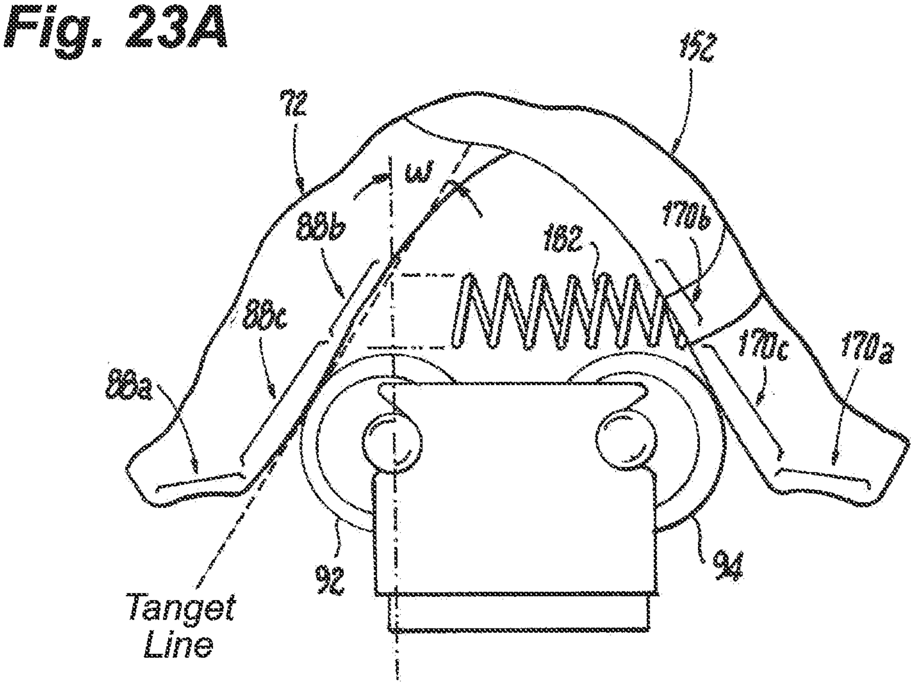
FIG. 23B is an enlarged side elevation view of the cam surfaces of each jaw member of the working head assembly of FIG. 23A taken from detail 23B, illustrating the rollers of the handle assembly in contact with cam surfaces of each jaw member at a point further along the convex surface segment of the cam surfaces.
Figure 24:
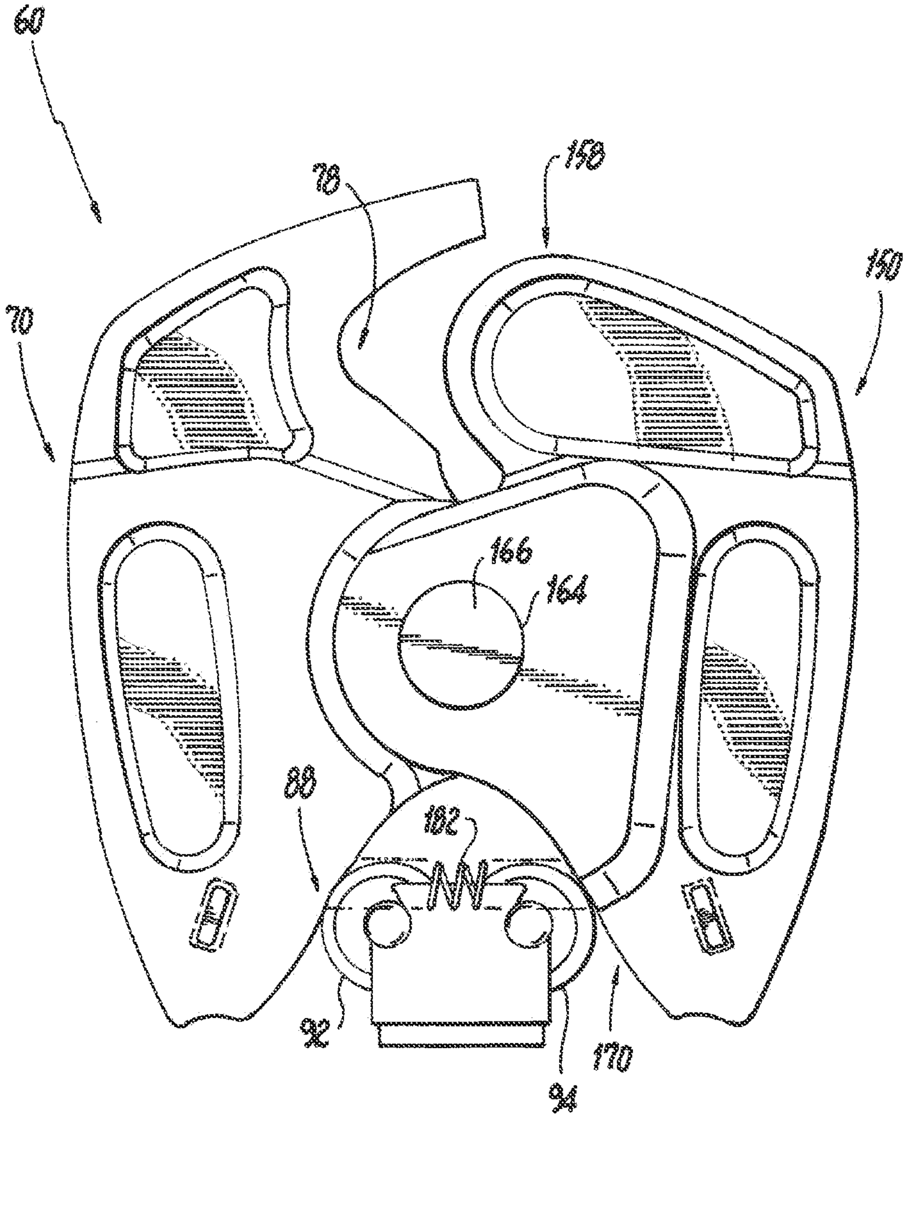
FIG. 24 is a side elevation view of the working head assembly of FIG. 21, illustrating the rollers of the handle assembly in contact with cam surfaces of each jaw when the jaws are in a crimping position.

In an exemplary embodiment, the cam surface 88 has a first concave surface segment 88*a*, a second concave surface segment 88*b* and a convex surface segment 88*c* between the first and second concave surface segments. Similarly, the cam surface 170 has a first concave surface segment 170*a*, a second concave surface segment 170*b* and a convex surface segment 170*c* between the first and second concave surface segments. When the jaw members 70 and 150 are in the home position, the first concave surface segment 88*a* is the at-rest position of roller 92 and the first concave surface segment 170*a* is the at rest position of roller 94, as seen in FIG. 21. When the jaw members 70 and 105 are in the crimp position, the second concave surface segment 88*b* is at the crimp position of roller 92 and the second concave surface segment 170*b* is at the crimp position of roller 94, as seen in FIG. 24. The convex surface segment 88*c* is configured so that the crimping force of the jaw members 70 and 150 can change depending upon where along the convex surfaces 88*c* and 170*c* the respective rollers 92 and 94 are. For example and referring to FIGS. 22A and 22B, when the roller 92 moves upwardly from the at-rest position in concave surface segment 88*a* to the convex surface segment 88*c* and the roller 94 moves upwardly from the at-rest position in concave surface segment 170*a* to the convex surface segment 170*c*, the incline of the concave surface segments 88*c* and 170*c* increases the force the jaw members 70 and 150 generate. Thus, if the barrel of a termination placed in the nest 78 is a large size barrel, the indentor 158 can generate sufficient force to crimp the large size barrel. If the barrel of a termination placed in the nest 78 is a medium size barrel, rollers 92 and 94 move along the convex surface segments 88*c* and 170*c* to a point where indentor 158 can generate sufficient force to crimp the medium size barrel, seen in FIGS. 23A and 23B. If the barrel of a termination placed in the nest 78 is a small size barrel, rollers 92 and 94 move along the convex surface segments 88*c* and 170*c* to a point where indentor 158 can generate sufficient force to crimp the small size barrel.

Figures 25, 26, 27, 28, 29, 30, 31, 32, 33, 34:
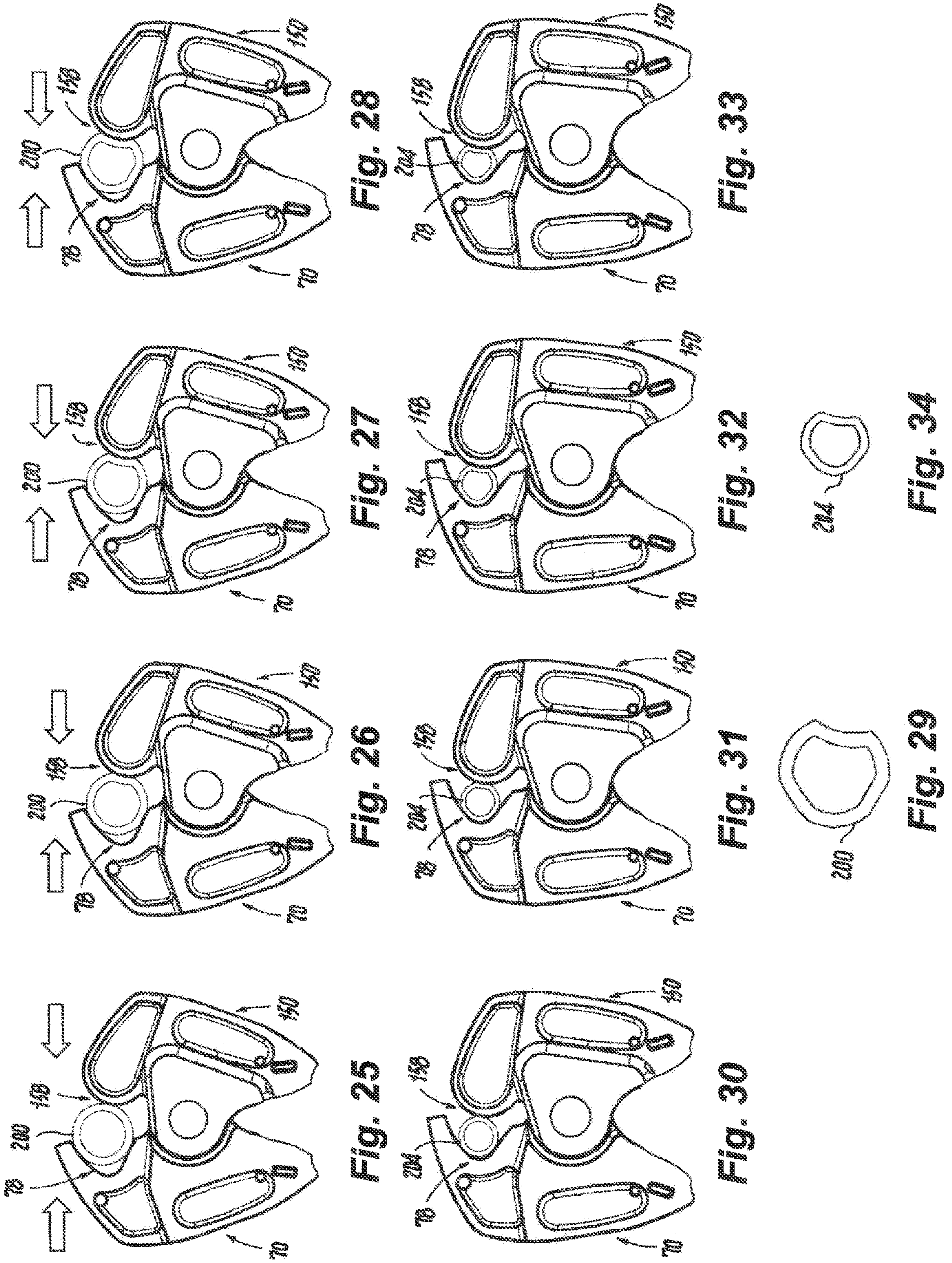
FIGS. 25-28 are side elevation views representing a crimping operation of the jaws of the working head assembly of the present disclosure while crimping a large size termination.
FIG. 29 is an end elevation view of the large termination of FIGS. 25-28 after the crimping operation is complete.
FIGS. 30-33 are side elevation views representing a crimping operation of the jaws of the working head assembly of the present disclosure while crimping a small size termination.
FIG. 34 is an end elevation view of the small termination of FIGS. 30-33 after the crimping operation is complete.
Figure 38:
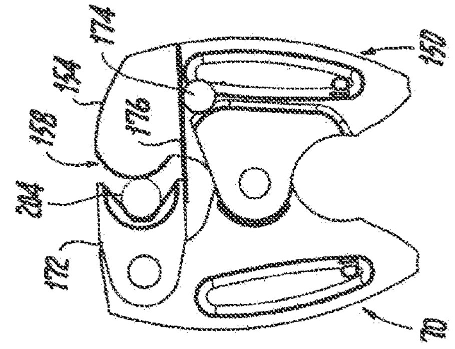
FIG. 38 is a side elevation view of the working head assembly of FIG. 35 with a barrel of a small size termination resting in the nest and in contact with the indentor, and illustrating the cantilevered spring maintaining alignment between the nest, the impact zone of the barrel of the small connector and the indentor.
Figure 37:
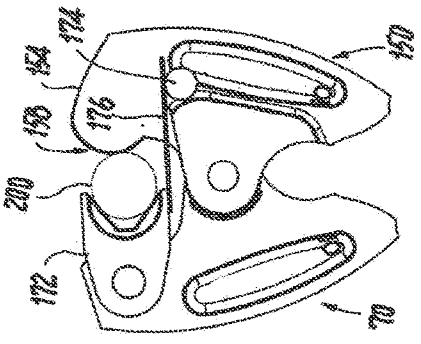
FIG. 37 is a side elevation view of the working head assembly of FIG. 35 with a barrel of a large size termination resting in the nest and in contact with the indentor, and illustrating the cantilevered spring maintaining alignment between the nest, the impact zone of the barrel of the large connector and the indentor.
Figure 36:
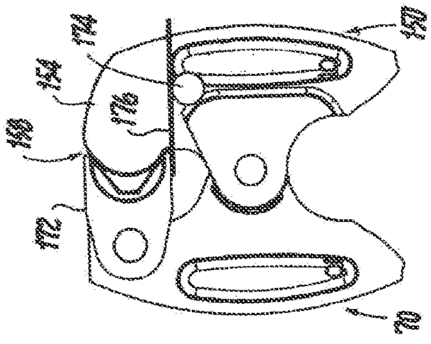
FIG. 36 is a side elevation view of the working head assembly of FIG. 35 in a fully seated position, and illustrating the cantilevered spring maintaining alignment between the nest and the indentor.
Figure 35:
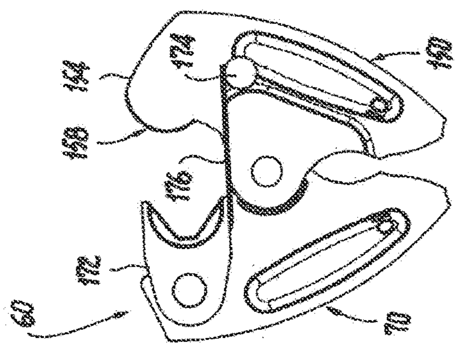
FIG. 35 is a side elevation view of another exemplary embodiment of a working head assembly according to the present disclosure with the jaw members in the home position, and illustrating a nest in a pivot arm of the first jaw member, an indentor on the second jaw member and a cantilevered spring with one end attached to the pivot arm and extending toward the second jaw member so that the free end of the spring rests on a guiding feature on the second jaw member, such as a pin or integral surface.
Figure 42:
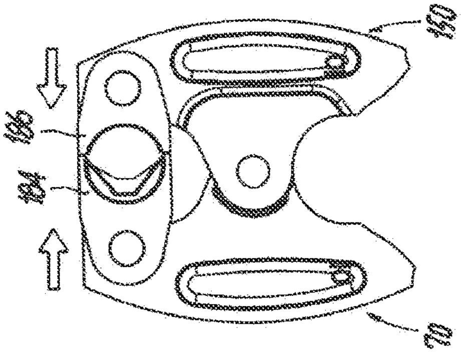
FIGS. 40-42 are side elevation views representing a crimping operation of the jaw members of the working head assembly of FIG. 39, illustrating the guide assembly between the first pivot arm and the second pivot arm maintaining alignment between the nest and the indentor as the jaw members move from the home position through the crimping position to the fully seated position.
Figure 41:
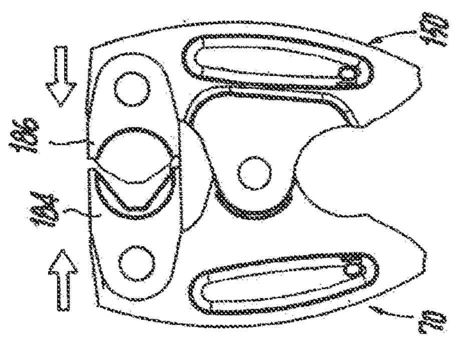
Figure 40:
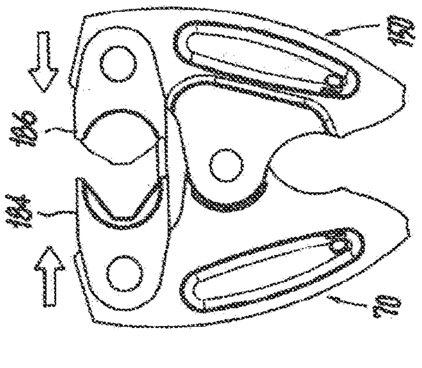
Figure 39:
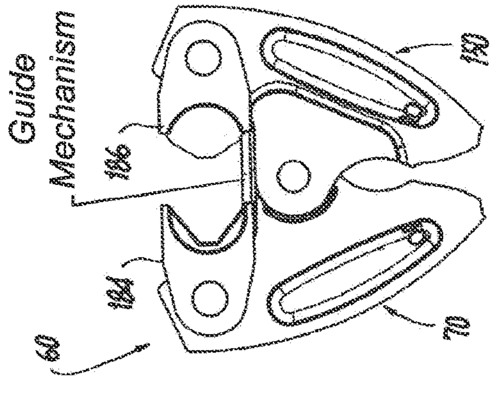
FIG. 39 is a side elevation view of another exemplary embodiment of a working head assembly according to the present disclosure with the jaw members in the home position, and illustrating the nest in a first pivot arm of the first jaw member, an indentor on a second pivot arm of the second jaw member, and a guide assembly between the first pivot arm and the second pivot arm that maintains alignment between the nest and the indentor.

The operation of the nest 78 and indentor 158 for crimping a termination 200 with a large barrel will be described with reference to FIGS. 25-29. Initially, with the jaw members 70 and 150 in the home position, a barrel of termination 200 is inserted between the jaw members and a conductor (not shown) is inserted into the barrel. The tool 10 is activated using for example the switches 48 or 50, until the rollers 92 and 94 move from their respective at-rest concave surface segments 88*a* and 170*a* to their respective convex surface segments 88*c* and 170*c* along cam surfaces 88 and 170 so that the impacting segment "$I_S$" of the indentor 158 contacts the barrel of the termination 200, as seen in FIG. 25. It is noted that in this scenario the closure angle between the first and second jaw members is "α," seen in FIG. 16. The closure angle is the angle between the first jaw member 70 and second jaw member 150 when the indentor 158 first contacts a barrel of a termination relative to the angle of the first jaw member 70 and second jaw member 150 at the point when the indentor 158 is fully seated in the nest 78, seen in FIG. 19A. It is noted that the indentor 158 does not have to travel through the full closure angle in order to crimp a conductor to a termination. Further activation of the tool 10 causes the rollers 92 and 94 to move further along the convex surface segments 88*c* and 170*c* of the cam surfaces 88 and 170 applying sufficient force on the barrel of the termination 200 to begin deforming the barrel and thus begin crimping the conductor (not shown) to the termination 200, as seen in FIG. 26. Further activation of the tool 10 causes the rollers 92 and 94 to move further along the convex surface segments 88*c* and 170*c* of the cam surfaces 88 and 170 applying sufficient force on the barrel of the termination 200 to further deform the barrel and crimp the conductor (not shown) to the termination 200, as seen in FIG. 27. Further activation of the tool 10 causes the rollers 92 and 94 to move further along the convex surface segments 88*c* and 170*c* of the cam surfaces 88 and 170 to complete the crimp operation such that the conductor (not shown) is crimped to the termination 200, as seen in FIG. 28. An example of the final deformation of the barrel of the termination after a crimping operation is shown in FIG. 29.

The operation of the nest 78 and indentor 108 for crimping a termination 204 with a small barrel will be described with reference to FIGS. 30-34. Initially, with the jaw members 70 and 150 in the home position, a barrel of termination 204 is inserted between the jaw members and a conductor (not shown) is inserted into the barrel. The tool 10 is activated using for example the switches 48 or 50, so that the rollers 92 and 94 move from their respective at rest concave surface segments 88*a* and 170*a* along to their respective convex surface segments 88*c* and 170*c* of the cam surfaces 88 and 170 until the impacting segment "$I_S$" of the indentor 158 contacts the barrel of the termination 204, as seen in FIG. 30. It is noted that the closure angle "γ" (seen in FIG. 18) is less than the closure angle "α" (seen in FIG. 16) due to the small diameter barrel of the termination 204. Further activation of the tool 10 causes the rollers 92 and 94 to move further along the convex surface segments 88*c* and 170*c* of the cam surfaces 88 and 170, applying sufficient force on the barrel of the termination 204 to begin deforming the barrel and thus begin crimping the conductor (not shown) to the termination 204, as seen in FIG. 31. Further activation of the tool 10 causes the rollers 92 and 94 to move further along the convex surface segments 88*c* and 170*c* of the cam surfaces 88 and 170, applying sufficient force on the barrel of the termination 204 to further deform the barrel and crimp the conductor (not shown) to the termination 204, as seen in FIG. 32. Further activation of the tool 10 causes the rollers 92 and 94 to move further along the convex surface segments 88*c* and 170*c* of the cam surfaces 88 and 170 to complete the crimp operation such that the conductor (not shown) is crimped to the termination 204, as seen in FIG. 33. An example of the final deformation of the small barrel of termination 204 after the crimping operation is shown in FIG. 34. It is noted that comparing the barrel of termination 200 in FIG. 29 with the barrel of termination 204 in FIG. 34 reveals that the final crimps have substantially the same shape such that the working head assembly 60 of the tool 10 provides substantially the same crimp over a wide range of termination barrel diameters.

It is noted that in instances where the termination is small such that the indentor 158 moves to the fully seated position during a crimping operation, the further activation of the tool 10 described above would cause the rollers 92 and 94 to move from the convex surface segments 88*c* and 170*c* of the cam surfaces 88 and 170 to the concave surface segments 88*b* and 170*b* to complete the crimp operation.

Referring now to FIGS. 35-38, another exemplary embodiment of a nest and indentor configuration is shown. In this exemplary embodiment, the nest 172 is pivotably attached to the jaw member 70. The nest 172 has substantially the same shape as a nest of a linear action tool, such as the nest described in commonly owned patent application Ser. No. 15/429,869 filed on Feb. 10, 2017 which is incorporated herein in its entirety by reference. The indentor 158 is substantially similar to the indentor described above and for ease of description is not repeated. In this exemplary embodiment, one or both jaw members 70 and 150 include a pin 174 and a cantilevered spring 176. In the embodiment shown, the pin 174 is secured to or formed into the distal end portion 154 of the jaw member 150. The cantilevered spring 176 is secured to or formed into the nest 172 and extends toward the second jaw member 150 so that a free end of the spring 176 rests on the pin 174 as shown. In this exemplary embodiment, as the jaw members 70 and 150 move along their arc pattern from the home position to the crimp position, the pin 174 and cantilevered spring 176 pivot the nest 172 so that it remains aligned with the indentor 158 to ensure a consistent crimp.

Referring now to FIGS. 39-42, another exemplary embodiment of a nest and indentor configuration is shown. In this exemplary embodiment, the nest 184 is pivotably attached to the jaw member 70 and the indentor 186 is pivotably attached to the jaw member 150. The nest 184 has substantially the same shape as a nest of a linear action tool, such as the nest described in commonly owned patent Application No. Feb. 10, 2017. The indentor 186 has substantially the same shape as an indentor of a linear action tool, such as the indentor described in commonly owned patent Application No. Feb. 10, 2017. In this exemplary embodiment, one or both jaw members 70 and 150 are operatively mounted to a guide mechanism, such as a rail and track system. In this configuration, as the jaw members 70 and 150 move along their arc pattern between the home position and the crimp position, the nest 184 and the indentor 186 can pivot so that they remain aligned to ensure a consistent crimp.

Turning to FIGS. 43-47, another exemplary embodiment of the working head assembly 60 of a tool 10 will be described. In this exemplary embodiment, the handle assembly 20 of the tool 10 is the same as the handle assembly described above and for ease of description is not repeated. In this exemplary embodiment, the structure of the cooperating jaws differ and to the extent they differ will be described in more detail. However, the coupling of the first jaw member 70 and the second jaw member 150 to the handle assembly 20 is the same as described above and the movement of the first jaw member 70 and the second jaw member 150 is substantially the same as described above and is not repeated. Accordingly, common elements of the first and second jaw members between the different embodiments described herein will utilize the same reference numerals.

Figure 43:
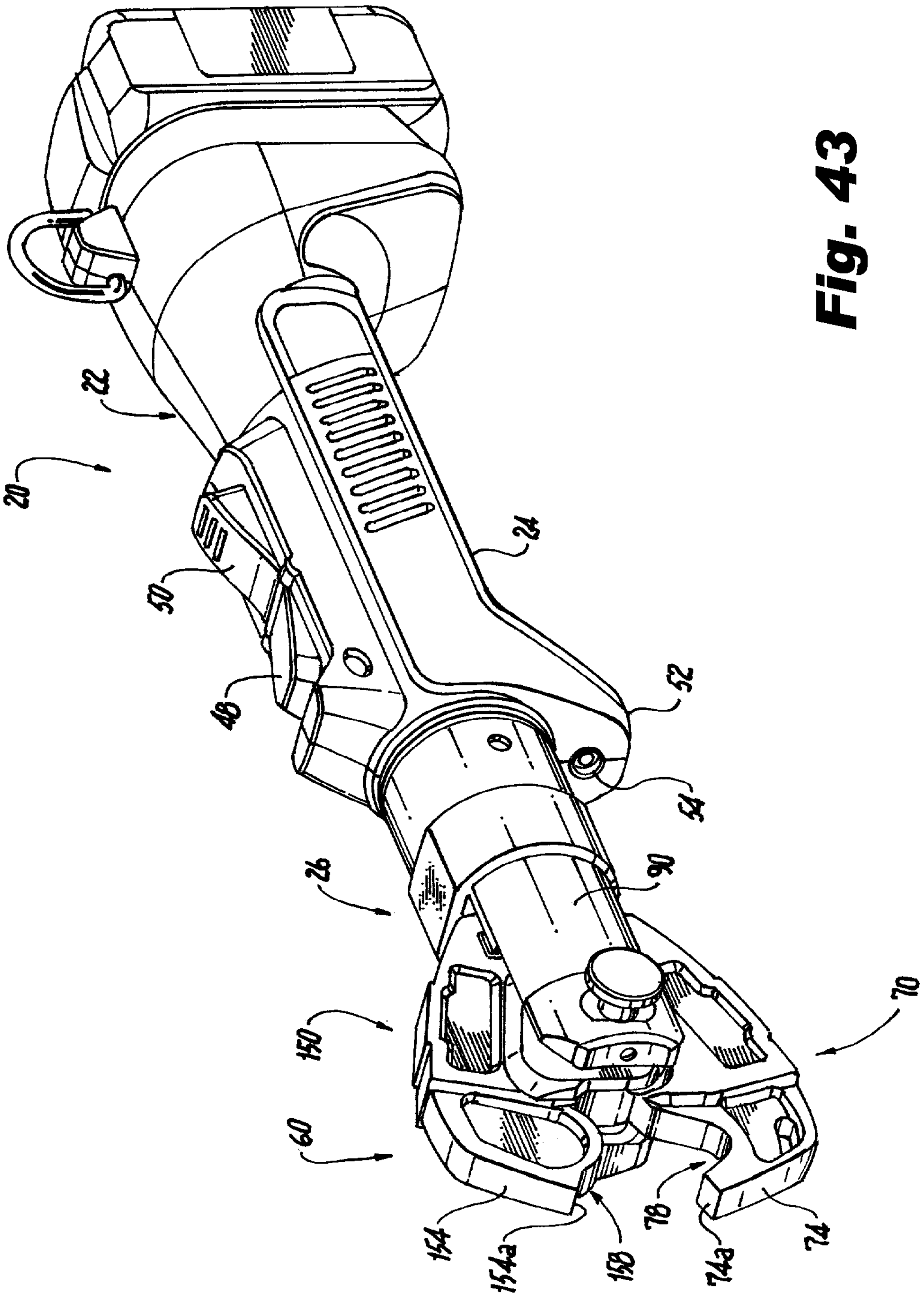
FIG. 43 is a perspective view of another exemplary embodiment of a tool according to the present disclosure, illustrating a working head assembly having crimping jaws in an open position and an in-line type handle assembly.

As shown in FIGS. 43 and 44, in this exemplary embodiment, the distal end portion 74 of the first jaw member 70 includes a substantially flat surface 74*a* that acts as a stop, and the distal end portion 154 of the second jaw member 150 includes a raised surface or bumper 154*a* with a substantially flat surface as a face. The stop 74*a* and bumper 154*a* are used during a crimping operation to inhibit the indentor 158 from contacting the surfaces 78*a*, 78*b* and 78*c* of the nest 78 during the crimping operation. More specifically, as the jaw members 70 and 150 move from the open position toward the fully seated position, the bumper 154*a* of the second jaw member 150 contacts the stop 74*a* of the first jaw member 70 thus limiting the angular motion or arcuate motion of the jaw members inhibiting the indentor 158 from contacting the surfaces 78*a*, 78*b* and 78*c* of the nest 78.

Referring to FIGS. 44-47, the distal end portion 74 of the first jaw member 70 may also include a hinge region 77. In the embodiment shown in FIGS. 44 and 45, the hinge region 77 includes an opening 79, such as slot, that is positioned adjacent an outer surface of the body 72 in proximity to the nest 78. The hinge region 77 is provided as a fail-safe mechanism such that in the event the nest 78 were to fail during, for example, a crimping operation, the failure would be directed toward the hinge region 77, here opening 79, so that at least a portion of the distal end portion 74 of the first jaw member 70 would bend outwardly in a direction away from the second jaw member 150, as shown by the arrows in FIG. 45. This bending of the at least a portion of the distal end portion 74 absorbs the nest failure while maintaining a connection between the portion of the nest that failed and the body 72. In the embodiment of FIGS. 46 and 47, the hinge region 77 is formed by annealing a portion of the distal end portion 74 of the first jaw member 70. By annealing the metal body 72, the physical and possibly chemical properties of the metal are altered to increase the plastically, e.g., ductility and/or malleability, of the metal to reduce its hardness and allowing the metal to deform under stress, e.g., tensile stress or compression stress, without fracturing. Similar to the embodiment of FIG. 45, the hinge region 77 is provided as a fail-safe mechanism such that in the event the nest 78 were to fail during, for example, a crimping operation, the failure would be directed toward the hinge region 77 so that at least a portion of the distal end portion 74 of the first jaw member 70 would bend outwardly in a direction away from the second jaw member 150, as shown by the arrows in FIG. 47. This bending of the at least a portion of the distal end portion 74 absorbs the nest failure while maintaining a connection between the portion of the nest that failed and the body 72.

Figure 48:
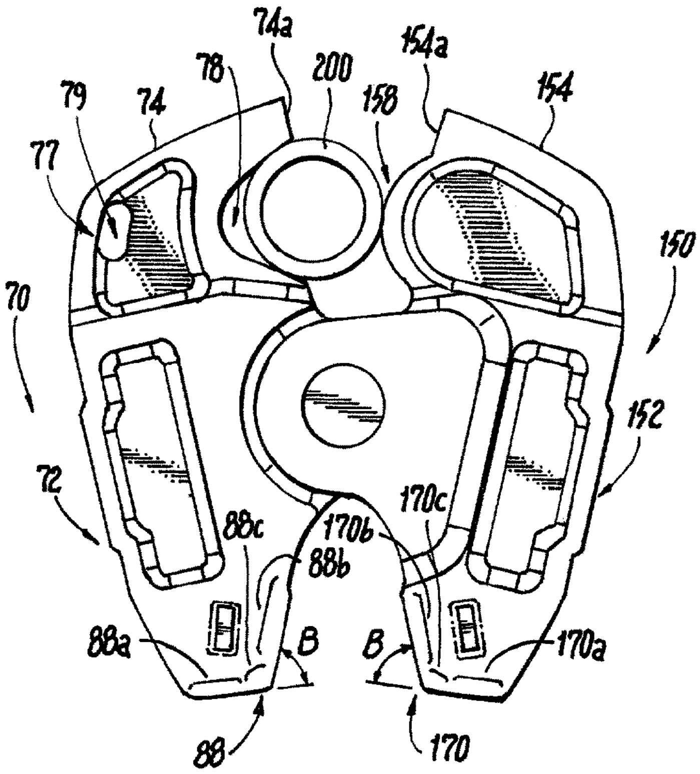
FIGS. 48-51 are side elevation views representing a crimping operation of the jaws of the working head assembly of FIG. 43 while crimping a large size termination.

Referring to FIG. 48, in this exemplary embodiment, the first surface segment 88*a*, second surface segment 88*b* and third surface segment 88*c* of the cam surface 88 differ from the cam surface segments in the embodiments described above. In this exemplary embodiment the first surface segment 88*a* is a linear surface, the second surface segment 88*b* is a linear surface, and the third surface segment 88*c* is an acute bend "B." The acute bend of the third surface segment 88*c* is provided to generate enough available force on the jaw member sufficient to fully deform the barrel of any termination within the nest 78, e.g., the barrel of termination 200, that is within the rated range of terminations the tool 100 is capable of crimping. The force generated may be in the range of about, for example, 9000 lbs. Preferably, the acute bend of the third surface segment 88*c* is between about 45 degrees and 90 degrees relative to the first surface segment 88*a*. Similarly, the first surface segment 170*a*, second surface segment 170*b* and third surface segment 170*c* of the cam surface 170 differ from the cam surface segments in the embodiments described above. In this exemplary embodiment, the first surface segment 170*a* is a linear surface, the second surface segment 170*b* is a linear surface, and the third surface segment 170*c* is an acute bend "B." The acute bend of the third surface segment 170*c* is provided to generate enough available force on the jaw member sufficient to fully deform the barrel of a termination within the nest 78, e.g., the barrel of termination 200, that is within the rated range of terminations the tool 100 is capable of crimping. The force generated may be in the range of about, for example, 9000 lbs. Preferably, the acute bend of the third surface segment 170*c* is between about 45 degrees and 90 degrees relative to the first surface segment 170*a*

Figure 49:
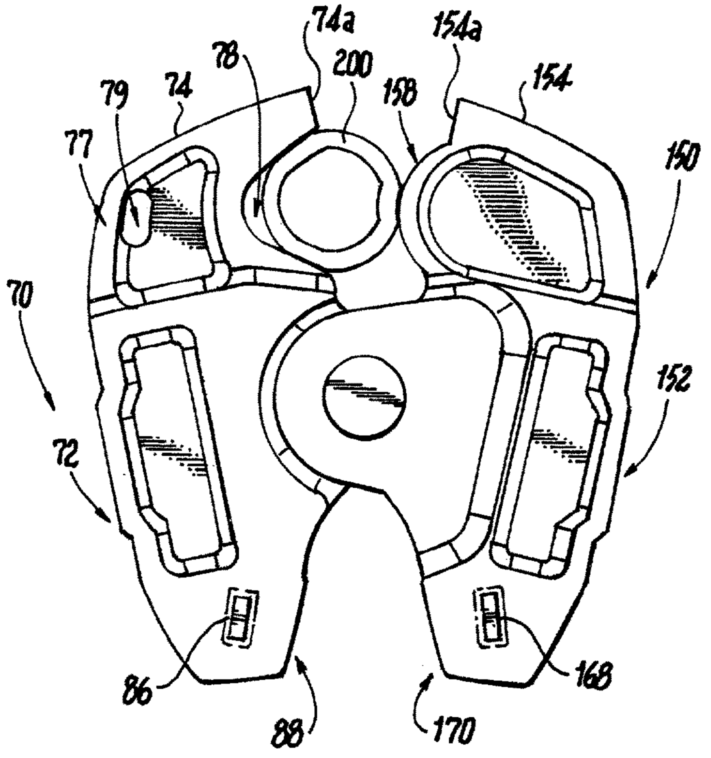
Figure 50:
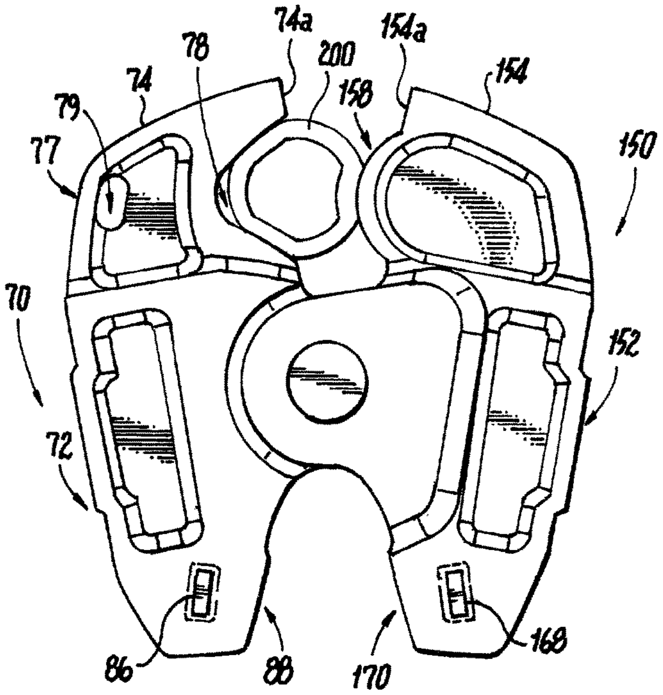
Figure 51:
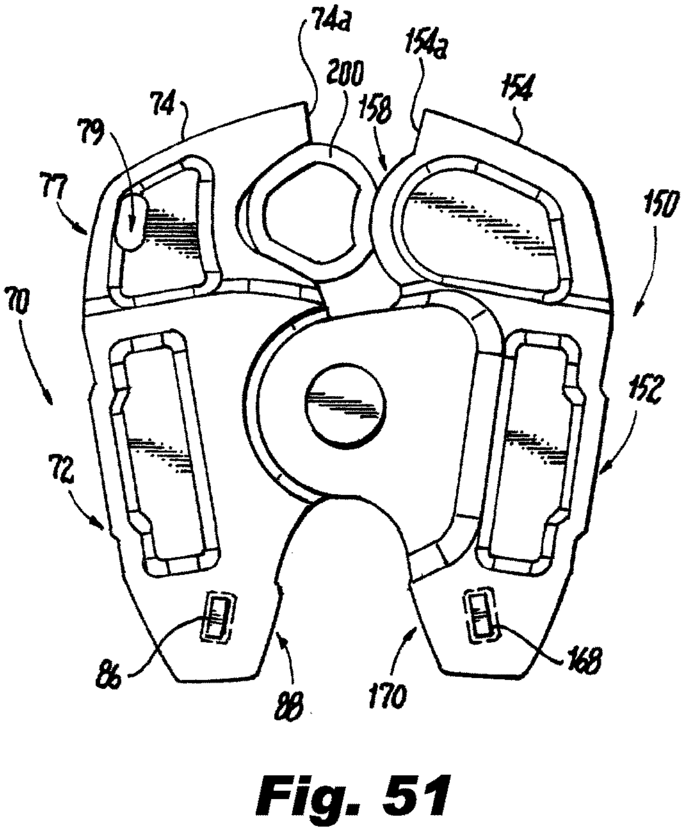
Figure 52:
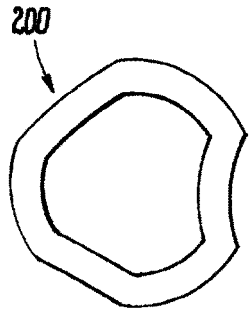
FIG. 52 is an end elevation view of the large termination of FIGS. 48-51 after the crimping operation is complete.

Referring to FIGS. 48-51, when the jaw members 70 and 150 are in the home position, the first surface segment 88*a* is the at-rest position of roller 92 and the first surface segment 170*a* is the at rest position of roller 94, similar to that seen in FIG. 21. When the jaw members 70 and 150 are in the crimp position, the second surface segment 88*b* is at the crimp position of roller 92 and the second surface segment 170*b* is at the crimp position of roller 94, similar to that in FIG. 24. The operation of the nest 78 and indentor 158 for crimping a termination 200 with a large barrel will be described. Initially, with the jaw members 70 and 150 in the home position, a barrel of termination 200 is inserted between the jaw members and a conductor (not shown) is inserted into the barrel. The tool 10 is activated using for example the switches 48 or 50, until the rollers 92 and 94 move from their respective at-rest first surface segments 88*a* and 170*a* to their respective third surface segments 88*c* and 170*c* generating sufficient force for the impacting segment "$I_S$" of the indentor 158 to impart the initial deformation of the barrel of the termination 200 and thus begin crimping the conductor (not shown) to the termination 200, as seen in FIG. 49. Further activation of the tool 10 causes the rollers 92 and 94 to move further along the cam surfaces 88 and 170 to the second surface segments 88*b* and 170*b* applying additional force on the barrel of the termination 200 to continue deforming the barrel and thus further crimping the conductor (not shown) to the termination 200, as seen in FIG. 50. Further activation of the tool 10 causes the rollers 92 and 94 to move further along the second surface segments 88*b* and 170*b* of the cam surfaces 88 and 170 applying additional force on the barrel of the termination 200 to further deform the barrel and complete the crimp operation such that the conductor (not shown) is crimped to the termination 200, as seen in FIG. 51. An example of the final deformation of the barrel of the termination after a crimping operation is shown in FIG. 52. It is noted that since the movement and operation of the jaw members 70 and 150 is the same as described above in reference to, for example, FIGS. 25-29, the final deformation of the barrel of the termination after a crimping operation is shown in FIG. 52 is substantially the same as the final deformation of the barrel of the termination after a crimping operation is shown in FIG. 29.

It is noted that in the exemplary embodiment of FIGS. 43-52, the available output force applied by the jaw members 70 and 150 on the barrel of a termination peaks as the rollers 92 and 94, similar to the rollers seen in FIG. 21, advance across the cam surface 88*c* and 170*c*, and then decreases as the rollers advance across cam surfaces 88*b* and 170*b*. This is done to limit the available force applied by the jaw members 70 and 150 on the barrel of a termination in order to induce the poppet valve 56, seen in FIG. 2, to activate in order to stop the crimping cycle before the termination is over-crimped. This activation of the poppet valve 56 happens while the rollers 92 and 94 are on specific locations on cam surfaces 88*b* and 170*b*, which depend on the diameter of the barrel of the termination being crimped. For larger terminations the poppet valve 56 activates when the rollers 92 and 94 are advancing along cam surfaces 88*b* and 170*b* but are in close proximity to the bend "B," i.e., closer to the cam surfaces 88*c* and 170*c* respectively. For medium terminations the poppet valve 56 activates when the rollers 92 and 94 are advancing further along cam surfaces 88*b* and 170*b* but are intermediate proximity to the bend "B," i.e., intermediate proximity to the cam surfaces 88*c* and 170*c* respectively. For smaller connectors the poppet valve 56 activates when the rollers 92 and 94 are advancing further along cam surfaces 88*b* and 170*b* but are further away from the cam surfaces 88*c* and 170*c* respectively relative to the intermediate proximity.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art and are intended to fall within the scope of the invention.

What is claimed is:

1. A working head assembly for a hydraulic crimping tool operating on a work object, the working head assembly comprising:

a first jaw member having a first surface, a second surface and a third surface between the first surface and second surface, such that the first surface, second surface and third surface form a nest configured to at least partially receive the work object, the first jaw member having a stop;

a second jaw member coupled to the first jaw member so that the first and second jaw members are movable between a home position and a fully seated position, the second jaw member includes an indentor configured to contact the work object in the nest and a bumper positioned so that when the indentor moves toward the nest, the bumper contacts the stop inhibiting the indentor from contacting at least one of the first surface, the second surface or third surface of the nest; and a biasing member having a first end attached to the first jaw member and a second end attached to the second jaw member such that the first and second jaw members are biased toward the home position.

2. The working head assembly according to claim 1, wherein the nest has an asymmetric shape.

3. The working head assembly according to claim 1, wherein the first surface is a concave surface relative to a center of the nest, the second surface is a convex surface relative to a center of the nest, and the third surface is a concave surface relative to a center of a nest.

4. The working head assembly according to claim 1, wherein a surface of the indentor configured to contact the work object is an arcuate shaped surface.

5. The working head assembly according to claim 1, wherein a geometry of the nest and the indentor is such that when the indentor contacts the work object in the nest the indentor contacts the center of the work object.

6. The working head assembly according to claim 1, wherein the second jaw member is movably coupled to the first jaw member by a locking pin.

7. The working head assembly according to claim 6, wherein the locking pin forms a pivot point between the first and second jaw members, such that the first and second jaw members pivot between the home position and the fully seated position.

8. The working head assembly according to claim 1, wherein the first jaw member includes a hinge region.

9. The working head assembly according to claim 8, wherein the hinge region comprises an opening located between an outer surface of the first jaw member and the nest.

10. The working head assembly according to claim 8, wherein the hinge region comprises an annealed portion of the first jaw member located between an outer surface of the first jaw member and the nest.

11. A hydraulic crimping tool operating on a work object, the hydraulic crimping tool comprising:

a handle assembly; and a working head assembly, the working head assembly including:

a first jaw member having a first surface, a second surface and a third surface between the first surface and second surface, such that the first surface, second surface and third surface form a nest configured to at least partially receive the work object, the first jaw member having a stop;

a second jaw member coupled to the first jaw member so that the first and second jaw members are movable between a home position and a fully seated position, the second jaw member includes an indentor configured to contact the work object in the nest and a bumper positioned so that when the indentor moves toward the nest, the bumper contacts the stop inhibiting the indentor from contacting at least one of the first surface, the second surface or third surface of the nest; and a biasing member having a first end attached to the first jaw member and a second end attached to the second jaw member such that the first and second jaw members are biased toward the home position.

12. The working head assembly according to claim 11, wherein the nest has an asymmetric shape.

13. The working head assembly according to claim 11, wherein the first surface is a concave surface relative to a center of the nest, the second surface is a convex surface relative to a center of the nest, and the third surface is a concave surface relative to a center of a nest.

14. The working head assembly according to claim 11, wherein a surface of the indentor configured to contact the work object is an arcuate shaped surface.

15. The working head assembly according to claim 11, wherein a geometry of the nest and the indentor is such that when the indentor contacts the work object in the nest the indentor contacts the center of the work object.

16. The working head assembly according to claim 11, wherein the second jaw member is movably coupled to the first jaw member by a locking pin.

17. The working head assembly according to claim 16, wherein the locking pin forms a pivot point between the first and second jaw members, such that the first and second jaw members pivot between the home position and the fully seated position.

18. The working head assembly according to claim 11, wherein the first jaw member includes a hinge region.

19. The working head assembly according to claim 18, wherein the hinge region comprises an opening located between an outer surface of the first jaw member and the nest.

20. The working head assembly according to claim 18, wherein the hinge region comprises an annealed portion of the first jaw member located between an outer surface of the first jaw member and the nest.

* * * * *